(12) United States Patent
Takeoka et al.

(10) Patent No.: US 11,282,649 B2
(45) Date of Patent: Mar. 22, 2022

(54) CAPACITOR

(71) Applicant: Panasonic Intellectual Property Management Co., Ltd., Osaka (JP)

(72) Inventors: Hiroki Takeoka, Nara (JP); Kazuhiro Nakatsubo, Toyama (JP); Taiyou Tsukahara, Toyama (JP); Hideki Masumi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 16/708,939

(22) Filed: Dec. 10, 2019

(65) Prior Publication Data
US 2020/0118762 A1 Apr. 16, 2020

Related U.S. Application Data

(63) Continuation of application No. PCT/JP2018/023562, filed on Jun. 21, 2018.

(30) Foreign Application Priority Data

| Jul. 12, 2017 | (JP) | ............................. JP2017-135913 |
| Jul. 12, 2017 | (JP) | ............................. JP2017-135914 |
| Jul. 12, 2017 | (JP) | ............................. JP2017-135915 |

(51) Int. Cl.
*H01G 4/32* (2006.01)
*H01G 2/10* (2006.01)
(Continued)

(52) U.S. Cl.
CPC .............. *H01G 4/32* (2013.01); *H01G 2/103* (2013.01); *H01G 4/224* (2013.01); *H01G 4/236* (2013.01)

(58) Field of Classification Search
CPC .......... H01G 4/32; H01G 4/236; H01G 2/103; H01G 4/224
(Continued)

(56) References Cited

U.S. PATENT DOCUMENTS

2013/0108915 A1* 5/2013 Fukuda ............... H01M 50/172
429/176
2017/0053744 A1 2/2017 Ichinose et al.

FOREIGN PATENT DOCUMENTS

| CN | 106298241 A * | 1/2017 |
| JP | 5-219704 | 8/1993 |

(Continued)

OTHER PUBLICATIONS

International Search Report of PCT application No. PCT/JP2018/023562 dated Sep. 11, 2018.

*Primary Examiner* — Arun Ramaswamy
(74) *Attorney, Agent, or Firm* — McDermott Will & Emery LLP

(57) ABSTRACT

A capacitor includes a capacitor element, a first electrode, a second electrode, a first bus bar, a second bus bar, an exterior member, and a filler resin. The first electrode is disposed on an end face of the capacitor element. The second electrode is disposed on another end face of the capacitor element. The first bus bar is connected to the first electrode. The second bus bar is connected to the second electrode. The exterior member covers the capacitor element. The filler resin fills an interior of the exterior member. The exterior member includes a metal laminate film and has an opening to lead out a part of the first bus bar and a part of the second bus bar. The opening is sealed with the filler resin.

21 Claims, 26 Drawing Sheets

(51) Int. Cl.
*H01G 4/224* (2006.01)
*H01G 4/236* (2006.01)

(58) Field of Classification Search
USPC .......................... 361/308.1, 309, 306.1, 310
See application file for complete search history.

(56) References Cited

FOREIGN PATENT DOCUMENTS

| | | | |
|---|---|---|---|
| JP | 2004-158775 | 6/2004 | |
| JP | 2005-277101 | 10/2005 | |
| JP | 2009177055 A * | 8/2009 | ............... H01G 2/10 |
| JP | 2010-016161 | 1/2010 | |
| JP | 2013-229390 | 11/2013 | |
| JP | 2016-157755 | 9/2016 | |
| WO | 2015/125436 | 8/2015 | |

* cited by examiner

CAPACITOR

RELATED APPLICATIONS

This application is a continuation of the PCT International Application No. PCT/JP2018/023562 filed on Jun. 21, 2018, which claims the benefit of foreign priority of Japanese patent application No. 2017-135913 filed on Jul. 12, 2017, Japanese patent application No. 2017-135914 filed on Jul. 12, 2017, and Japanese patent application No. 2017-135915 filed on Jul. 12, 2017, the contents all of which are incorporated herein by reference.

BACKGROUND

1. Technical Field

The present disclosure relates to a capacitor such as a film capacitor.

2. Description of the Related Art

International Publication No. WO 2015/125436 discloses a film capacitor that includes a capacitor element, bus bars, and an exterior member made of a metal laminate film. The capacitor element has electrodes on both end faces. The bus bars are connected to the respective electrodes and extending outward in mutually opposite directions. The exterior member covers the capacitor element and the two bus bars such that the bus bars are partly led out. Since the exterior member covers the capacitor element, it prevents the capacitor element from absorbing moisture.

The film capacitor of International Publication No. WO 2015/125436 has lead-out portions through which the bus bars are partly led out from the exterior member in two directions along which one of the bus bars and the other bus bar extend outward respectively. In each of the lead-out portions, a second resin layer containing an acid-modified resin is formed between a first resin layer that constitutes an inner surface of the exterior member and each of the bus bars. Such a sealing structure including the second resin layer hinders the formation of a gap between the first resin layer and each of the bus bars, and thus the lead-out portions of the exterior member provide increased sealing performance.

The metal laminate film includes an inner resin layer, a metal layer, and an outer resin layer that are stacked and integrated together. Thicknesses of the inner resin layer, the metal layer, and the outer resin layer may be, for example, 80 μm, 40 μm, and 25 μm, respectively.

SUMMARY

A capacitor according to a first aspect of the present disclosure includes a capacitor element, a first electrode, a second electrode, a first bus bar, a second bus bar, an exterior member, and a filler resin. The first electrode is disposed on an end face of the capacitor element. The second electrode is disposed on another end face of the capacitor element. The first bus bar is connected to the first electrode. The second bus bar is connected to the second electrode. The exterior member covers the capacitor element. The filler resin fills an interior of the exterior member. The exterior member includes a metal laminate film and has an opening through which a part of the first bus bar and a part of the second bus bar are led out. The filler resin seals the opening.

The capacitor provided according to the first aspect of the present disclosure can satisfactorily prevent the capacitor element from absorbing moisture.

A capacitor according to a second aspect of the present disclosure includes a capacitor element, a first electrode, a second electrode, a first bus bar, a second bus bar, an exterior member, and a sealing member. The first electrode is disposed on an end face of the capacitor element. The second electrode is disposed on another end face of the capacitor element. The first bus bar is connected to the first electrode. The second bus bar is connected to the second electrode. The exterior member covers the capacitor element. The exterior member includes a metal laminate film and has an opening through which a part of the first bus bar and a part of the second bus bar are led out. The sealing member seals the opening. The first bus bar and the second bus bar pass through the sealing member.

The capacitor provided according to the second aspect of the present disclosure can satisfactorily prevent the capacitor element from absorbing moisture.

A capacitor according to a third aspect of the present disclosure includes a capacitor element, an exterior member, and a coating layer. The capacitor element has an electrode on each of both end faces of the capacitor element. The exterior member covers the capacitor element. The coating layer covers an outer peripheral edge of the electrode. The exterior member includes a metal laminate film. The coating layer has an electrical insulating property.

The capacitor provided according to the third aspect of the present disclosure can satisfactorily secure electrical insulation between a metal layer of the exterior member and the capacitor element when the exterior member covering the capacitor element includes a metal laminate film.

Effects or meanings of the present disclosure will be further clarified in the following description of exemplary embodiments. However, each of the exemplary embodiments shown below is merely one example of implementing the present disclosure, and the present disclosure is not at all limited to the examples described in the following exemplary embodiments.

DETAILED DESCRIPTION OF EMBODIMENT

Figure 1:
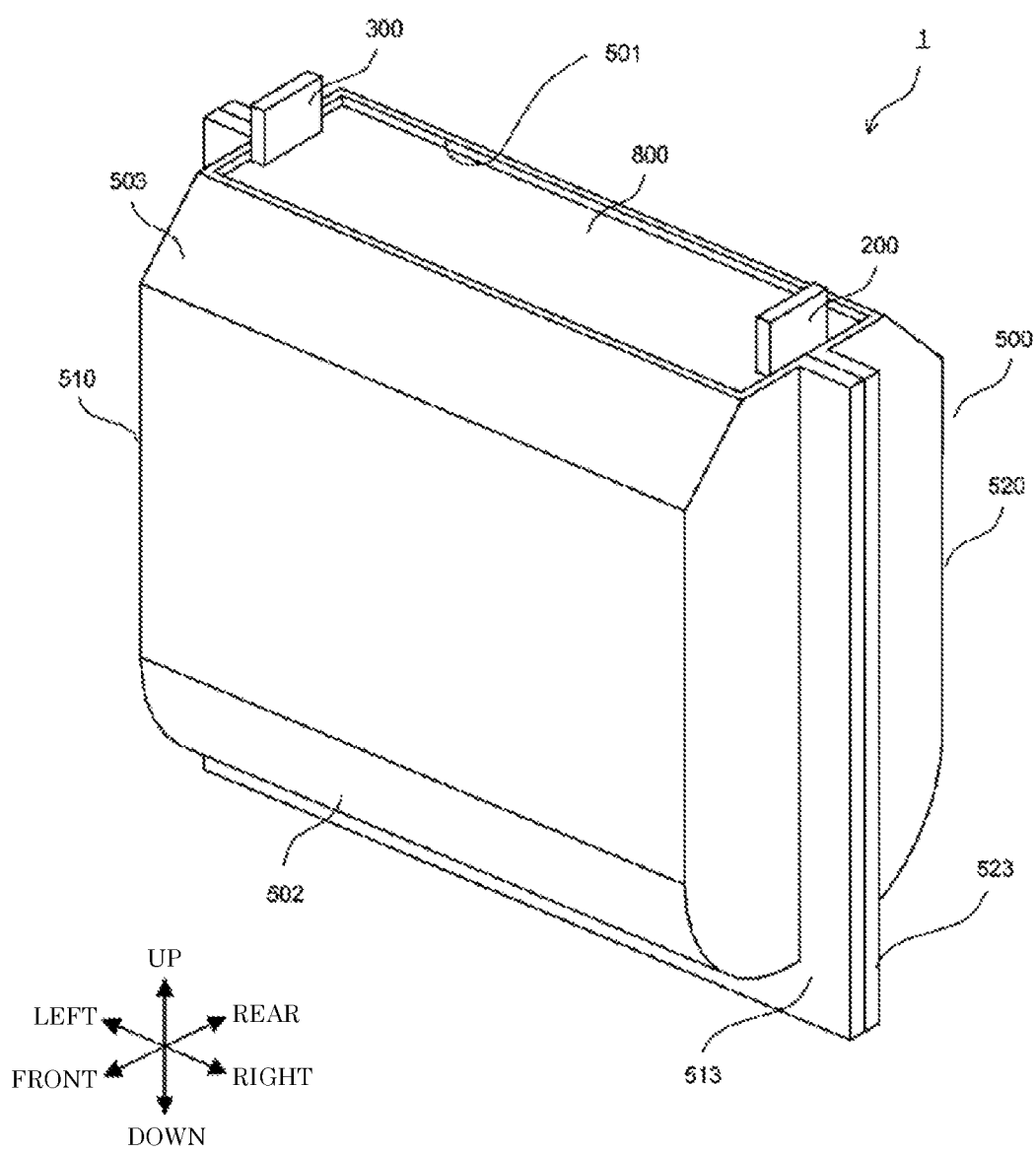
FIG. 1 is a perspective view illustrating a film capacitor according to a first exemplary embodiment.

Problems with the conventional technique will be briefly described prior to description of exemplary embodiments of the present disclosure.

The film capacitor of International Publication No. WO 2015/125436 requires the exterior member to have sealing structures at a periphery of the capacitor element in the two directions. This may cause a decrease in sealing performance by a defect in any of the sealing structures in the two directions. Thus, there is a concern that the exterior member is not able to satisfactorily prevent the capacitor element from absorbing moisture.

In view of the above problem, the first and second aspects of the present disclosure each provide a capacitor that is able to satisfactorily prevent a capacitor element from absorbing moisture.

In the film capacitor of International Publication No. WO 2015/125436, electrical insulation between the metal layer of the exterior member, which includes a metal laminate film, and the capacitor element, which is covered with the exterior member, is maintained by the inner resin layer of the exterior member.

An outer peripheral edge of the electrode (e.g., metallikon electrode formed by thermal spraying of zinc) formed on each of both end faces of the capacitor element is angular and relatively sharp. As described above, the inner resin layer has a very small thickness. Thus, contact of the electrode edge with the inner resin layer may damage and break the inner resin layer. As a result, the inner resin layer may become unable to secure electrical insulation between the capacitor element and the metal layer of the exterior member.

In view of the above problem, the third aspect of the present disclosure provides a capacitor that is able to satisfactorily secure electrical insulation between a metal layer of an exterior member and a capacitor element when the exterior member covering the capacitor element includes a metal laminate film.

First Exemplary Embodiment

A first exemplary embodiment of the present disclosure will be described below with reference to the accompanying drawings. For the sake of convenience, directions including front and rear, right and left, and up and down are added to the drawings as appropriate. These directions in the drawings are not absolute directions but relative directions of film capacitor 1 and components.

In the present exemplary embodiment, film capacitor 1 corresponds to a "capacitor" described in the appended claims First end-face electrode 101 and second end-face electrode 102 correspond to a "first electrode" and a "second electrode" respectively described in the claims. First bus bar 200 and second bus bar 300 correspond to a "first bus bar" and a "second bus bar" respectively described in the claims. Upper end 503 corresponds to an "end portion of the exterior member" described in the claims. First component 510 and second component 520 correspond to a "first component" and a "second component" respectively described in the claims.

However, the above description is only intended to define correspondences between constituents shown in the appended claims and constituents shown in the exemplary embodiment. The correspondences described above should not be construed to limit the scope of the present disclosure described in the appended claims to the configuration described in the exemplary embodiment.

Figure 2:
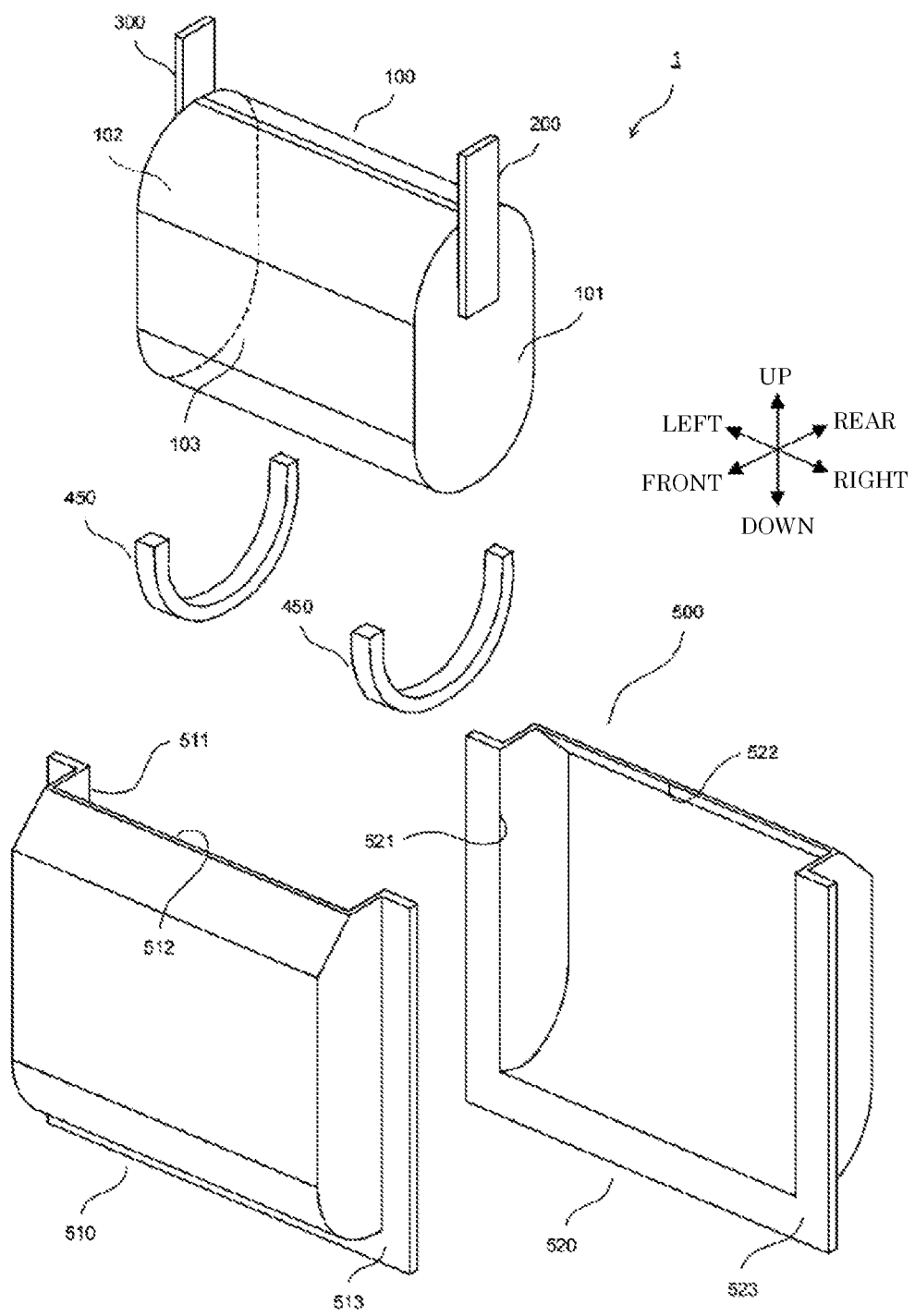
FIG. 2 is an exploded perspective view illustrating the film capacitor according to the first exemplary embodiment.
Figure 3A:
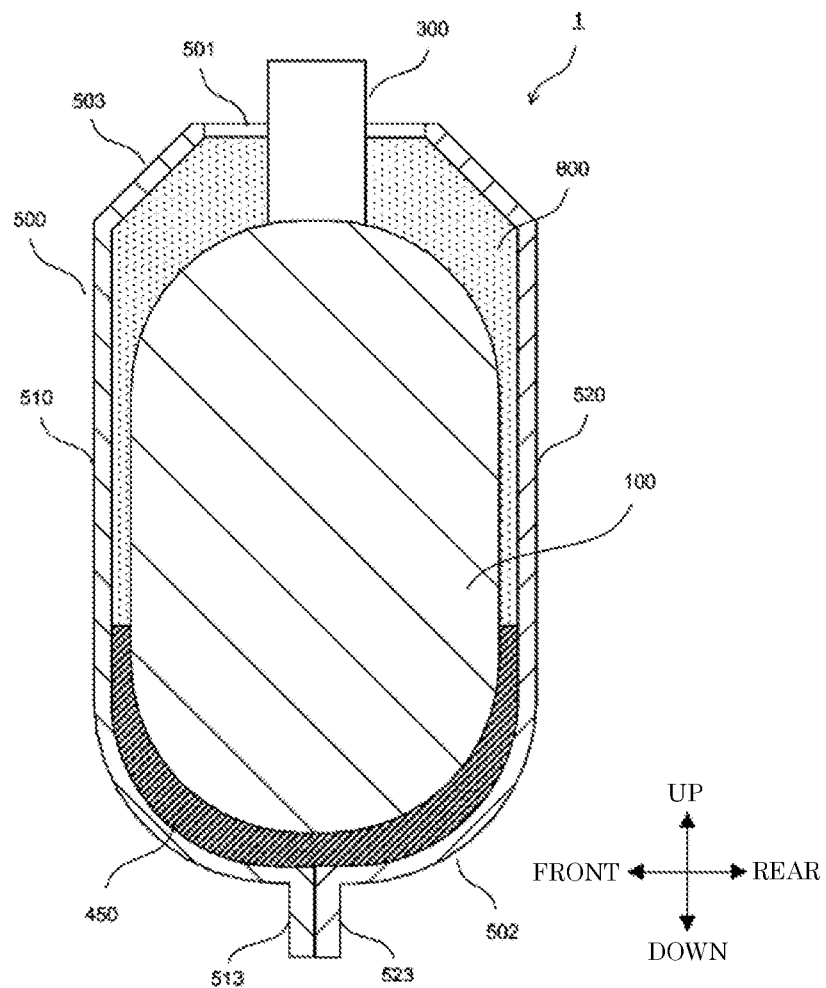
FIG. 3A is a side cross-sectional view illustrating the film capacitor according to the first exemplary embodiment cut at a position of a spacer.
Figure 3B:
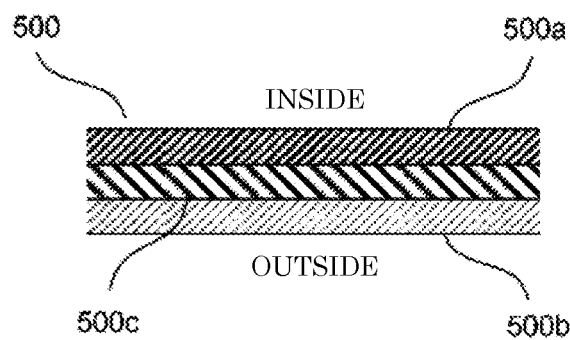
FIG. 3B is an enlarged cross-sectional view illustrating an exterior member according to the first exemplary embodiment.

FIG. 1 is a perspective view illustrating film capacitor 1 according to the present exemplary embodiment. FIG. 2 is an exploded perspective view illustrating film capacitor 1 according to the present exemplary embodiment. FIG. 3A is a side cross-sectional view illustrating film capacitor 1 according to the present exemplary embodiment cut at a position of spacer 450, and FIG. 3B is an enlarged cross-sectional view illustrating exterior member 500 according to the present exemplary embodiment. In FIGS. 1 to 3A, exterior member 500 is illustrated in a large thickness for the sake of convenience. The same applies to FIG. 4A and subsequent drawings in which the thickness of exterior member 500 is shown.

Film capacitor 1 includes capacitor element 100, first bus bar 200, second bus bar 300, two spacers 450, exterior member 500, and filler resin 800.

Capacitor element 100 is formed by winding or laminating stacked metalized films, and pressing a wound body or a laminated body of the stacked metalized films into a flat shape. The stacked metalized films are formed by stacking two metalized films in each of which aluminum is deposited on a dielectric film. End faces of capacitor element 100 each have a substantially oval shape. In capacitor element 100, first end-face electrode 101 is formed on one of the end faces by spraying metal such as zinc, and similarly, second end-face electrode 102 is formed on the other end face by spraying metal such as zinc.

Capacitor element 100 of the present exemplary embodiment includes the metalized films in each of which aluminum is deposited on the dielectric film. Meanwhile, capacitor element 100 may include the metalized films in each of which other metal such as zinc and magnesium is deposited on the dielectric film. Alternatively, capacitor element 100 may include the metalized films in each of which a plurality of metals among such metals are deposited on the dielectric film or include the metalized films in each of which an alloy of such metals is deposited on the dielectric film.

Each of first bus bar 200 and second bus bar 300 is made of a conductive material such as copper, and is formed into a rectangular plate shape. One end of first bus bar 200 is electrically connected to first end-face electrode 101 of capacitor element 100 by a connection method such as soldering or welding, and one end of second bus bar 300 is electrically connected to second end-face electrode 102 of capacitor element 100 by a connection method such as soldering or welding. Each of first bus bar 200 and second bus bar 300 is led out upward from capacitor element 100.

Spacer 450 is made of a resin material such as polyphenylene sulfide (PPS) and is formed into a substantially U shape. Two spacers 450 are fit onto a lower circular arc part of outer peripheral surface 103 of capacitor element 100. One of two spacers 45 is disposed adjacent to the one end face of the capacitor element, and the other of two spacers 45 is disposed adjacent to the other end face of the capacitor element. A number of spacers 450 is not limited to two and may be changed as needed.

A periphery of capacitor element 100, which is connected with first bus bar 200 and second bus bar 300, is covered with exterior member 500.

Exterior member 500 is a box having a substantially rectangular parallelepiped shape that is long in a right-left direction (a width direction of outer peripheral surface 103 of capacitor element 100) and short in a front-rear direction (a lateral direction of the end face of capacitor element 100). An upper surface of the exterior member has opening 501 having a rectangular shape that is long in the right-left direction. Meanwhile, lower end 502 of exterior member 500 has a circular arc shape corresponding to the lower part of outer peripheral surface 103 of capacitor element 100 which has a circular arc shape. Upper end 503 of exterior member 500 has a tapered shape that becomes narrow in width in the front-rear direction toward opening 501. The other end of first bus bar 200 and the other end of second bus bar 300 are led out from exterior member 500 through opening 501.

Exterior member 500 is formed of a metal laminate film that has, as shown in FIG. 3B, a three-layer structure including first resin layer 500a, second resin layer 500b, and metal layer 500c sandwiched between first resin layer 500a and second resin layer 500b. First resin layer 500a is, for example, made of polypropylene, whereas second resin layer 500b is, for example, made of nylon. Polypropylene is a resin that has a melting point lower than that of nylon. Metal layer 500c is, for example, made of aluminum foil. A thickness of exterior member 500 is approximately 100 μm. Exterior member 500 has low moisture permeability because of the presence of metal layer 500c, and is lightweight because of the small thickness.

Exterior member 500 includes first component 510 and second component 520, which are separable in the front-rear direction. First component 510 covers a front half (first portion) of capacitor element 100, and second component 520 covers a rear half (second portion) of capacitor element 100.

A rear surface of first component 510 is open as rear surface opening 511, and an upper surface of the first component is open as upper surface opening 512. A front surface of second component 520 is open as front surface opening 521, and an upper surface of the second component is open as upper surface opening 522. Upper surface opening 512 of first component 510 and upper surface opening 522 of second component 520 are joined together to constitute opening 501 of exterior member 500.

In first component 510, first flange 513 is formed as a tab for bonding so as to surround a left edge, a right edge, and a lower edge of rear surface opening 511. In second component 520, second flange 523 is formed as a tab for bonding so as to surround a left edge, a right edge, and a lower edge of front surface opening 521. First flange 513 and second flange 523 are overlapped each other in the front-rear direction, and a surface of first flange 513 and a surface of second flange 523 are bonded together.

An internal capacity of exterior member 500 is greater than a volume of capacitor element 100, and thus a space exists between capacitor element 100 and an inner surface of exterior member 500. Two spacers 450 are disposed between capacitor element 100 and the inner surface of exterior member 500.

An interior of exterior member 500, which covers capacitor element 100, is filled with filler resin 800. Filler resin 800 includes a thermosetting resin such as an epoxy resin. Opening 501 of exterior member 500 is sealed with filler resin 800 which fills inside exterior member 500. Capacitor element 100, a part of first bus bar 200, and a part of second bus bar 300 are covered with filler resin 800 as well as exterior member 500.

FIGS. 4A to 4D are drawings illustrating steps in a process of assembling film capacitor 1 according to the present exemplary embodiment.

Figure 4A:
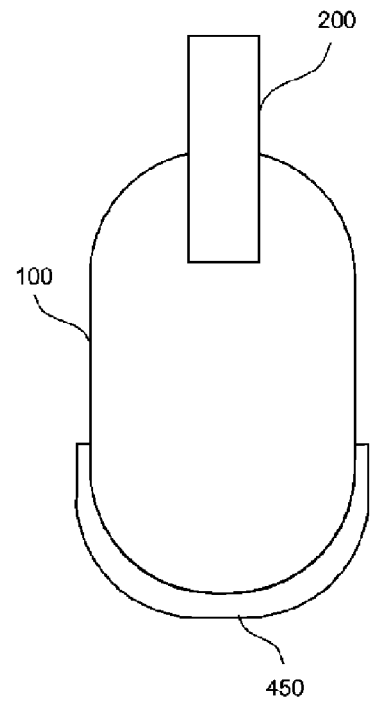
FIG. 4A is a drawing illustrating a step in a process of assembling the film capacitor according to the first exemplary embodiment.
Figure 4B:
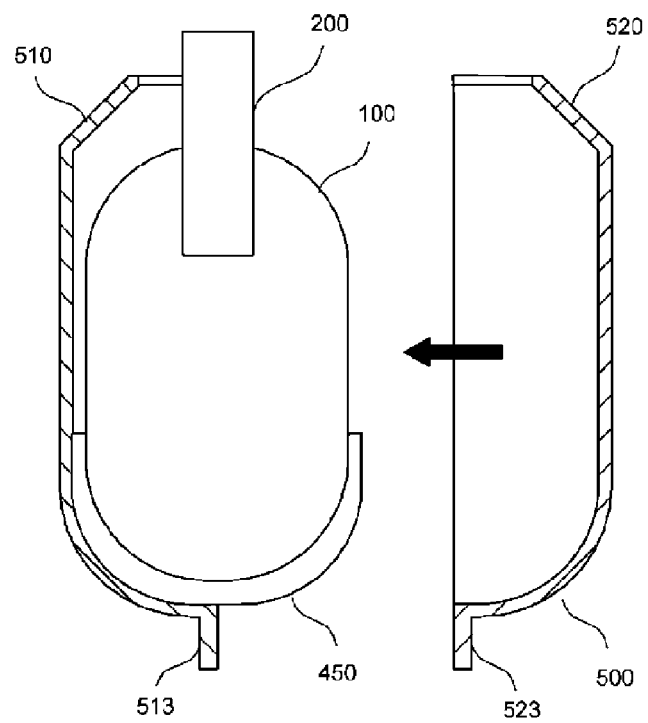
FIG. 4B is a drawing illustrating a step in the process of assembling the film capacitor according to the first exemplary embodiment.
Figure 4C:
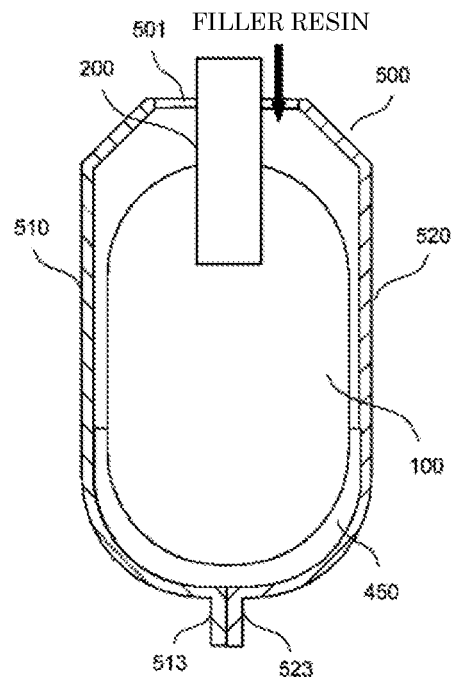
FIG. 4C is a drawing illustrating a step in the process of assembling the film capacitor according to the first exemplary embodiment.
Figure 4D:
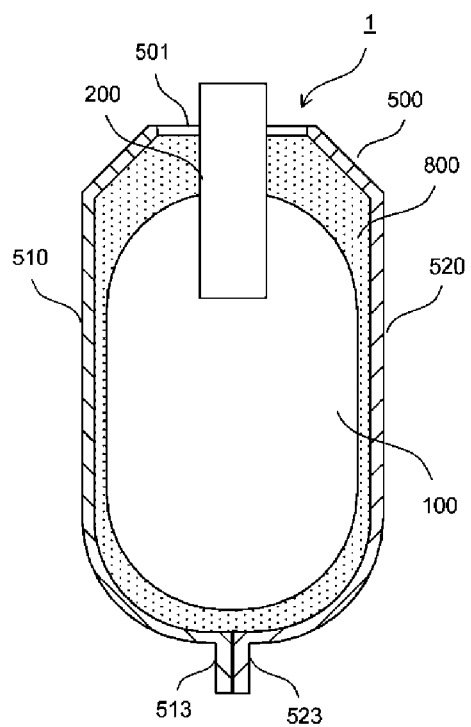
FIG. 4D is a drawing illustrating a step in the process of assembling the film capacitor according to the first exemplary embodiment.

As shown in FIG. 4A, two spacers 450 are fit onto capacitor element 100, which is connected with first bus bar 200 and second bus bar 300. Next, as shown in FIG. 4B, a front half portion of capacitor element 100, onto which spacers 450 are fit, is housed inside first component 510. Second component 520 is joined to first component 510 housing capacitor element 100, and thermal welding is applied to first flange 513 and second flange 523 that are overlapped each other. First flange 513 and second flange 523 are bonded to each other by heat fusing first resin layers 500a of first flange 513 and second flange 523. Hence, first second component 510 and second component 520 are joined together to complete exterior member 500 such that capacitor element 100, a part of first bus bar 200, and a part of second bus bar 300 are covered with exterior member 500. Due to spacers 450, capacitor element 100 is disposed at a predetermined position inside exterior member 500. Next, as shown in FIG. 4C, molten filler resin 800 is injected into exterior member 500 through opening 501, and thus the interior of exterior member 500 is filled with filler resin 800. After that, exterior member 500 is heated and filler resin 800 inside cures. In this case, even if there is a part inadequately welded between first flange 513 and second flange 523 which are thermally welded, filler resin 800 gets into a gap of the part to ensure sealing performance. Thus, as shown in FIG. 4D, film capacitor 1 is completed.

<Effects of First Exemplary Embodiment>

Film capacitor 1 configured according to the present exemplary embodiment can exhibit effects described below.

Capacitor element 100 is covered with exterior member 500 made of the metal laminate film. The metal laminate film has low moisture permeability because metal layer 500c is disposed between first resin layer 500a and second resin layer 500b. This enables exterior member 500 to exhibit an enhanced moisture interception effect. Hence, it is expected that the effect of preventing capacitor element 100 from absorbing moisture is improved.

Opening 501 through which a part of first bus bar 200 and a part of second bus bar 300 are led out from exterior member 500 is sealed with filler resin 800 that fills inside exterior member 500. This can ensure airtightness inside exterior member 500.

A part of first bus bar 200 and a part of second bus bar 300 are led out through identical opening 501. Hence, it is satisfactory that exterior member 500 has a sealing structure of filler resin 800 for one direction in the periphery of capacitor element 100. Hence, as shown in the conventional technique, there is no concern about a decline in sealing performance by a defect in any of sealing structures for a plurality of directions such as two directions.

Capacitor element 100 is covered with filler resin 800 as well as exterior member 500. Thus, filler resin 800 also intercepts moisture. It is expected that the effect of preventing capacitor element 100 from absorbing moisture is further improved.

Upper end 503 of exterior member 500 has a tapered shape that becomes narrow in width in the front-rear direction toward opening 501. This configuration allows opening 501, which needs to be sealed with filler resin 800, to become small. Hence, it is expected that the effect of preventing capacitor element 100 from absorbing moisture is further improved.

Exterior member 500 is formed by joining first component 510 and second component 520 together, and hence capacitor element 100 can be housed inside exterior member 500 without passing through opening 501. This configuration allows opening 501 to become small. It is expected that the effect of preventing capacitor element 100 from absorbing moisture is further improved.

The film capacitor configured in this way according to the present exemplary embodiment is able to satisfactorily prevent capacitor element 100 from absorbing moisture.

Modified Examples of First Exemplary Embodiment

The exemplary embodiment of the present disclosure has been described above, but the present disclosure is not limited to the exemplary embodiment described above. Application examples of the present disclosure can include various modifications in addition to the above exemplary embodiment.

Figure 5A:
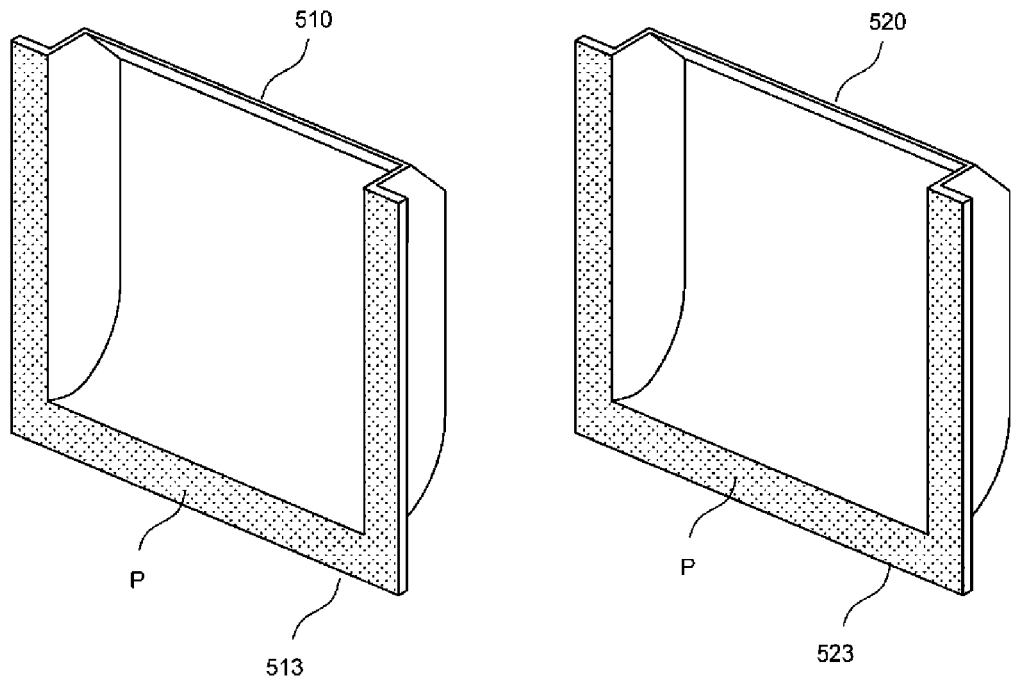
FIG. 5A is a perspective view illustrating a first component and a second component according to a modified example of the first exemplary embodiment.

In the exemplary embodiment described above, first flange 513 of first component 510 and second flange 523 of second component 520 are, for example, thermally welded together. Meanwhile, first flange 513 and second flange 523 may be bonded to each other with adhesive P. In this case, as shown in FIG. 5A, adhesive P may be applied to first flange 513 and second flange 523. Alternatively, adhesive P may be applied to any one of first flange 513 and second flange 523. In this modified example, in contrast to the case where thermal welding is performed, it may not be necessarily that first resin layer 500a is made of a resin material having low melting point, and second resin layer 500b is made of a resin material having high melting point. Hence, in first component 510 and second component 520, first resin layer 500a and second resin layer 500b may be made of the same resin material each other. For instance, both first resin layer 500a and second resin layer 500b may be made of nylon.

Figure 5B:
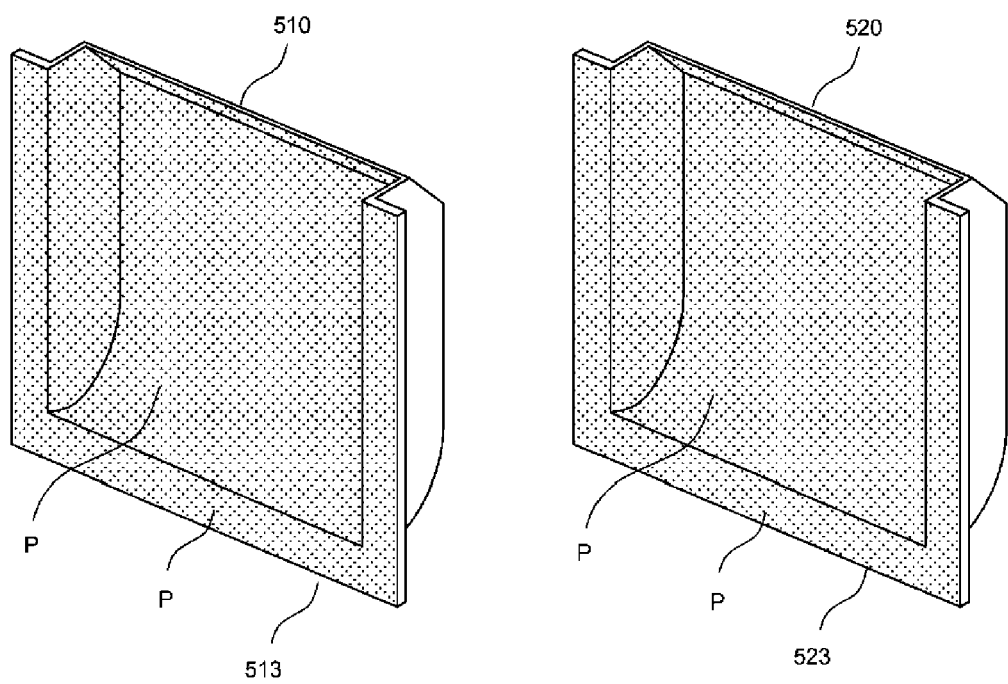
FIG. 5B is a perspective view illustrating a first component and a second component according to a modified example of the first exemplary embodiment.

As shown in FIG. 5B, adhesive P may be applied to an inner surface of each of first component 510 and second component 520, i.e., the inner surface of exterior member 500. This configuration causes adhesiveness between the inner surface of exterior member 500 and filler resin 800 increase by boding with adhesive P, and thus prevents ingress of moisture into an interface between the inner surface of exterior member 500 and filler resin 800. In this case, as shown in FIG. 5B, adhesive P may also be applied to first flange 513 and second flange 523 to bond first component 510 and second component 520 to each other with adhesive P.

Figure 6A:
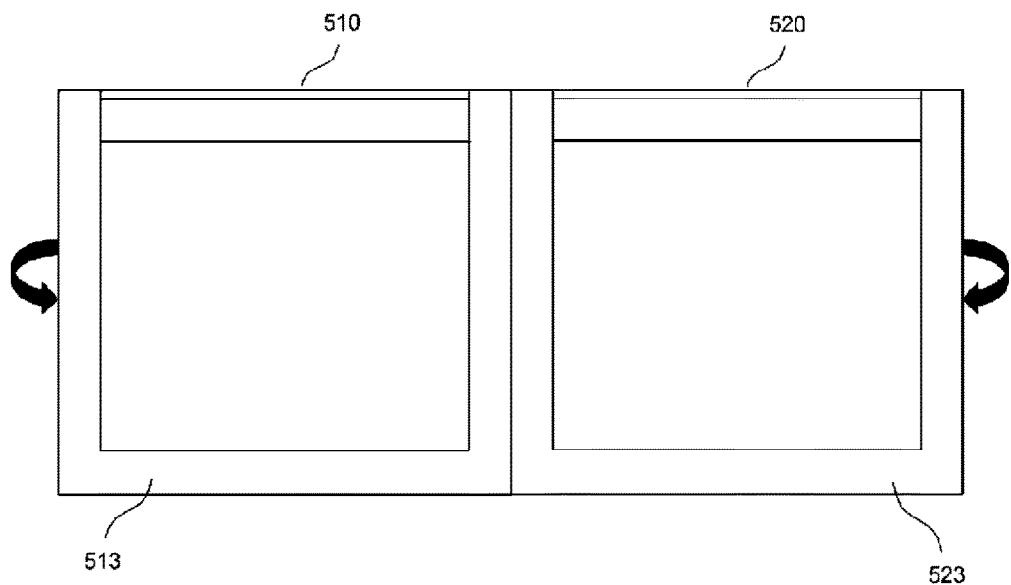
FIG. 6A is a drawing illustrating a process of assembling a first component and a second component together according to a modified example of the first exemplary embodiment.
Figure 6B:
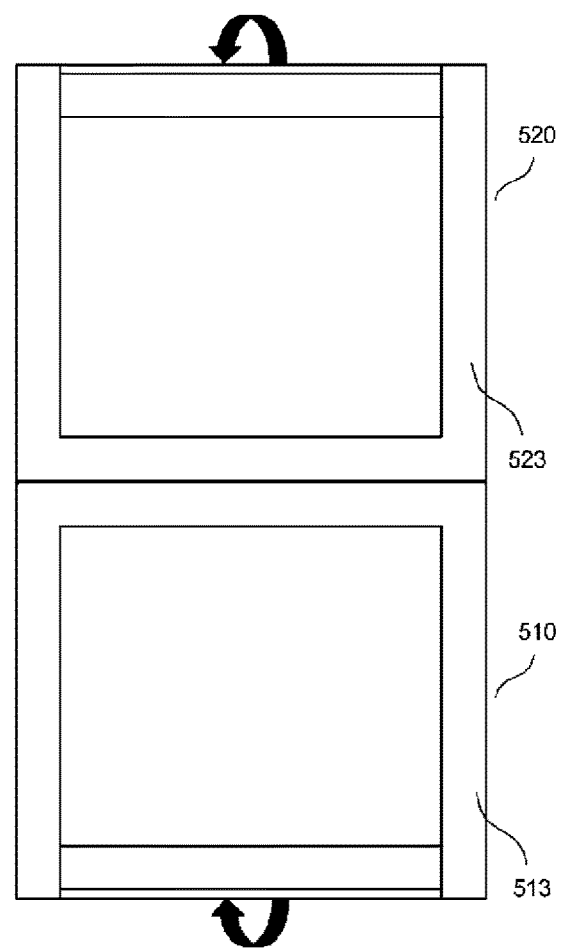
FIG. 6B is a drawing illustrating a process of assembling a first component and a second component together according to a modified example of the first exemplary embodiment.

In the exemplary embodiment described above, first component 510 and second component 520 are completely separated from each other. Meanwhile, first component 510 and second component 520 may be partly connected to each other. For instance, as shown in FIG. 6A, a left end of first flange 513 of first component 510 may be connected to a left end of second flange 523 of second component 520. Alternatively, as shown in FIG. 6B, a lower end of first flange 513 of first component 510 may be connected to a lower end of second flange 523 of second component 520. In these cases, as shown with arrows in FIGS. 6A and 6B, first component 510 and second component 520 are joined together by bending at a connection part between first component 510 and second component 520.

Figure 7A:
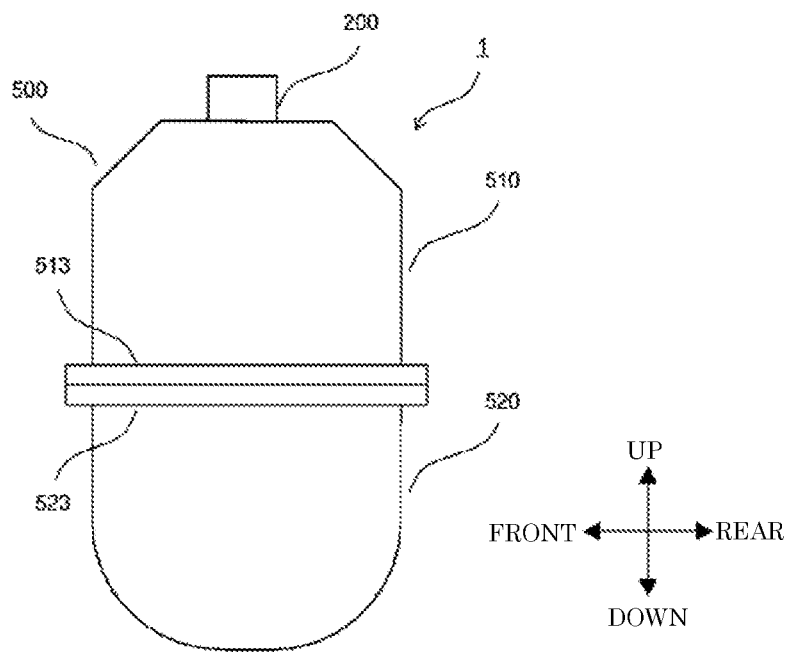
FIG. 7A is a right side view illustrating a film capacitor according to a modified example of the first exemplary embodiment.
Figure 7B:
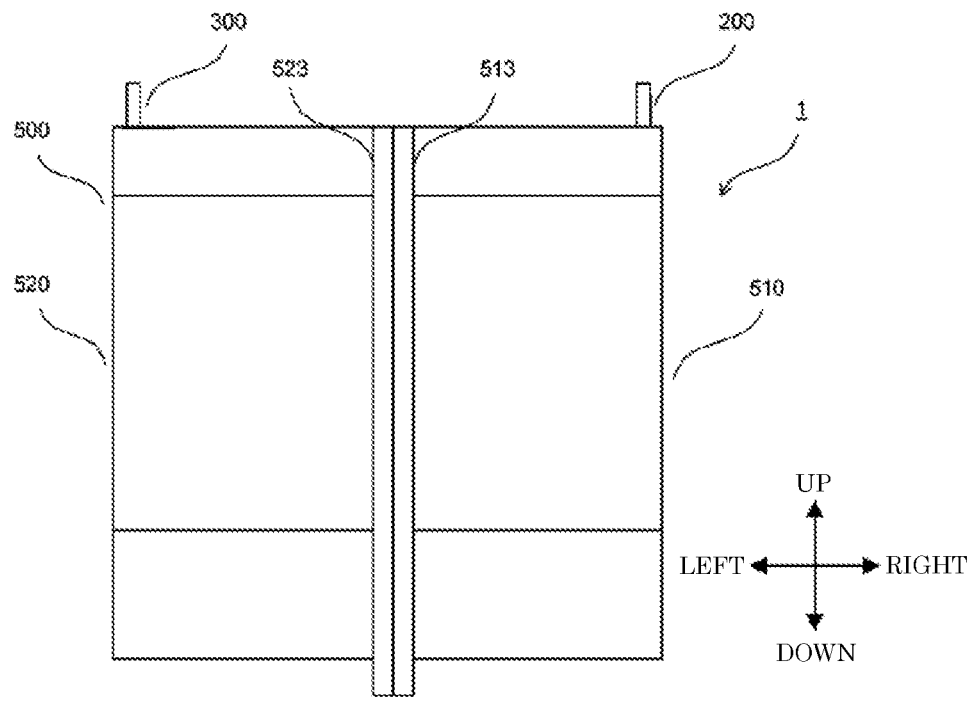
FIG. 7B is a front view illustrating a film capacitor according to a modified example of the first exemplary embodiment.

In the exemplary embodiment described above, exterior member 500 is divided into two parts, which are first component 510 and second component 520, in the front-rear direction. Meanwhile, a direction in which exterior member 500 is divided is not limited to the direction described above. For instance, as shown in FIG. 7A, exterior member 500 may be divided into two parts, which are first component 510 and second component 520, in an up-down direction. As shown in FIG. 7B, exterior member 500 may be divided into two parts, which are first component 510 and second component 520, in the right-left direction.

Figure 8:
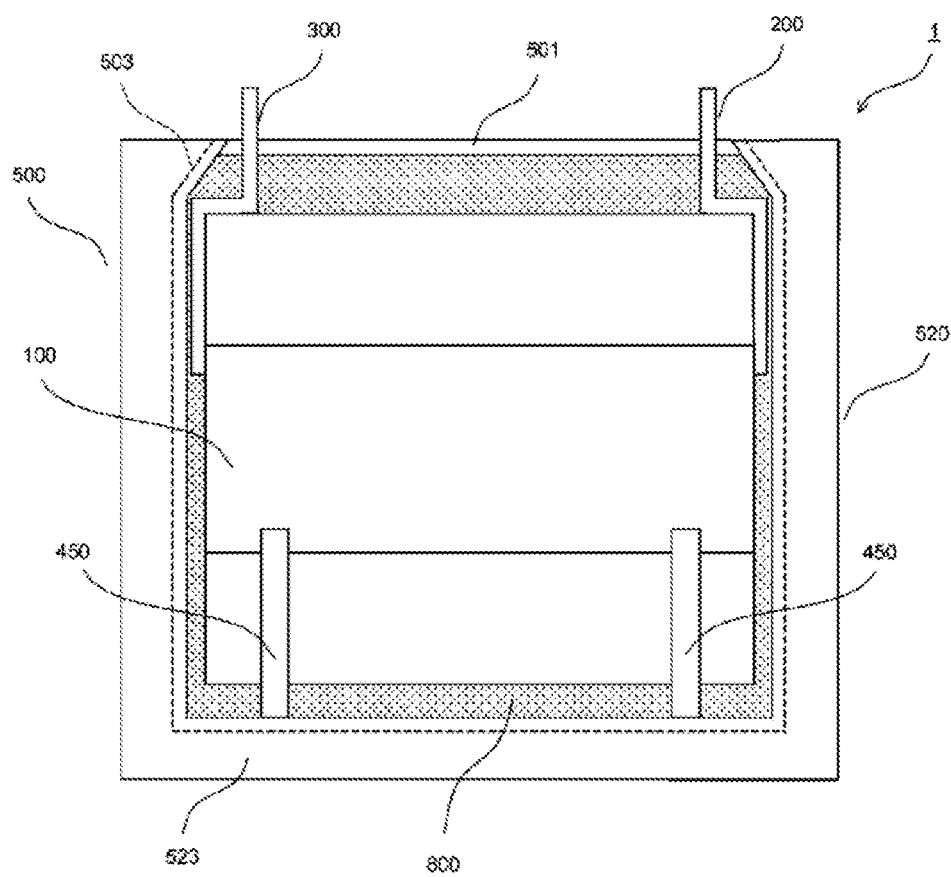
FIG. 8 is a front cross-sectional view illustrating a film capacitor according to a modified example of the first exemplary embodiment.
Figure 8:
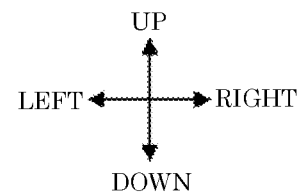

In the exemplary embodiment described above, in order to make opening 501 smaller, upper end 503 of exterior member 500 (an end portion adjacent to opening 501) tapers such that its width in the front-rear direction become narrow toward opening 501. Meanwhile, as shown in FIG. 8, upper end 503 of exterior member 500 may taper such that its width in the right-left direction become narrow toward opening 501. In this case, first bus bar 200 and second bus bar 300 can be each bent inward at an upper edge of capacitor element 100, and then extend upward. In addition, the width of upper end 503 of exterior member 500 in the front-rear direction may become narrow or may not become narrow. In the exemplary embodiment described above, the width of upper end 503 of exterior member 500 become narrow linearly. Meanwhile, the width of upper end 503 may become narrow in a curved fashion.

In the exemplary embodiment described above, film capacitor 1 has two spacers 450. Meanwhile, it may not be necessarily that film capacitor 1 has spacers 450. For instance, a gap between capacitor element 100 and the inner surface of exterior member 500 can be maintained by setting alignment between capacitor element 100 and exterior member 500 with a dedicated fixing jig.

Second Exemplary Embodiment

A second exemplary embodiment of the present disclosure will be described below with reference to the accompanying drawings. For the sake of convenience, directions including front and rear, right and left, and up and down are added to the drawings as appropriate. These directions in the drawings are not absolute directions but relative directions of film capacitor 1 and components.

In the exemplary embodiment, film capacitor 1 corresponds to a "capacitor" described in the appended claims First end-face electrode 101 and second end-face electrode 102 correspond to a "first electrode" and a "second electrode" respectively described in the claims. First bus bar 200 and second bus bar 300 correspond to a "first bus bar" and a "second bus bar" respectively described in the claims Sealing plate 400 corresponds to a "sealing member" described in the claims.

However, the above description is only intended to define correspondences between constituents shown in the appended claims and constituents shown in the exemplary embodiment. The correspondences described above should not be construed to limit the scope of the present disclosure described in the appended claims to the configuration described in the exemplary embodiment.

Figure 9:
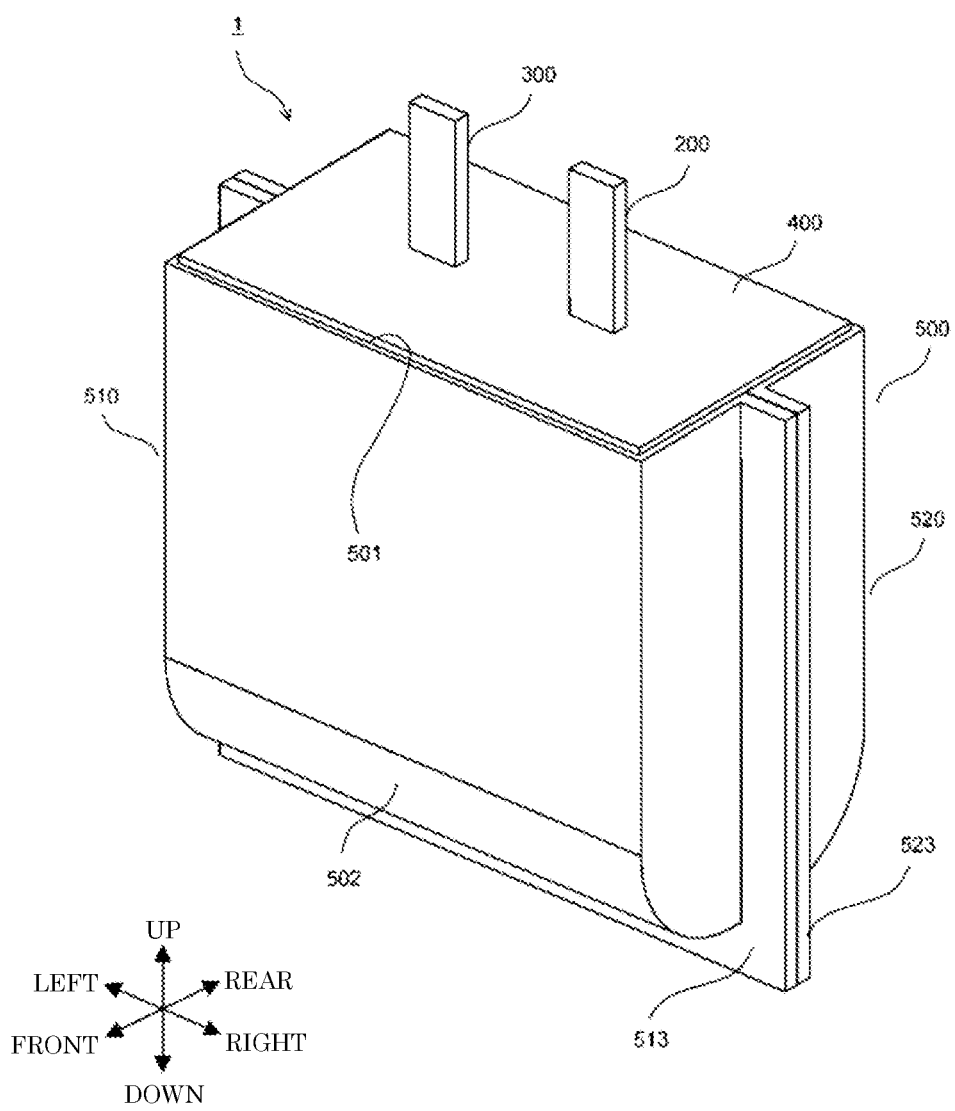
FIG. 9 is a perspective view illustrating a film capacitor according to a second exemplary embodiment.
Figure 10:
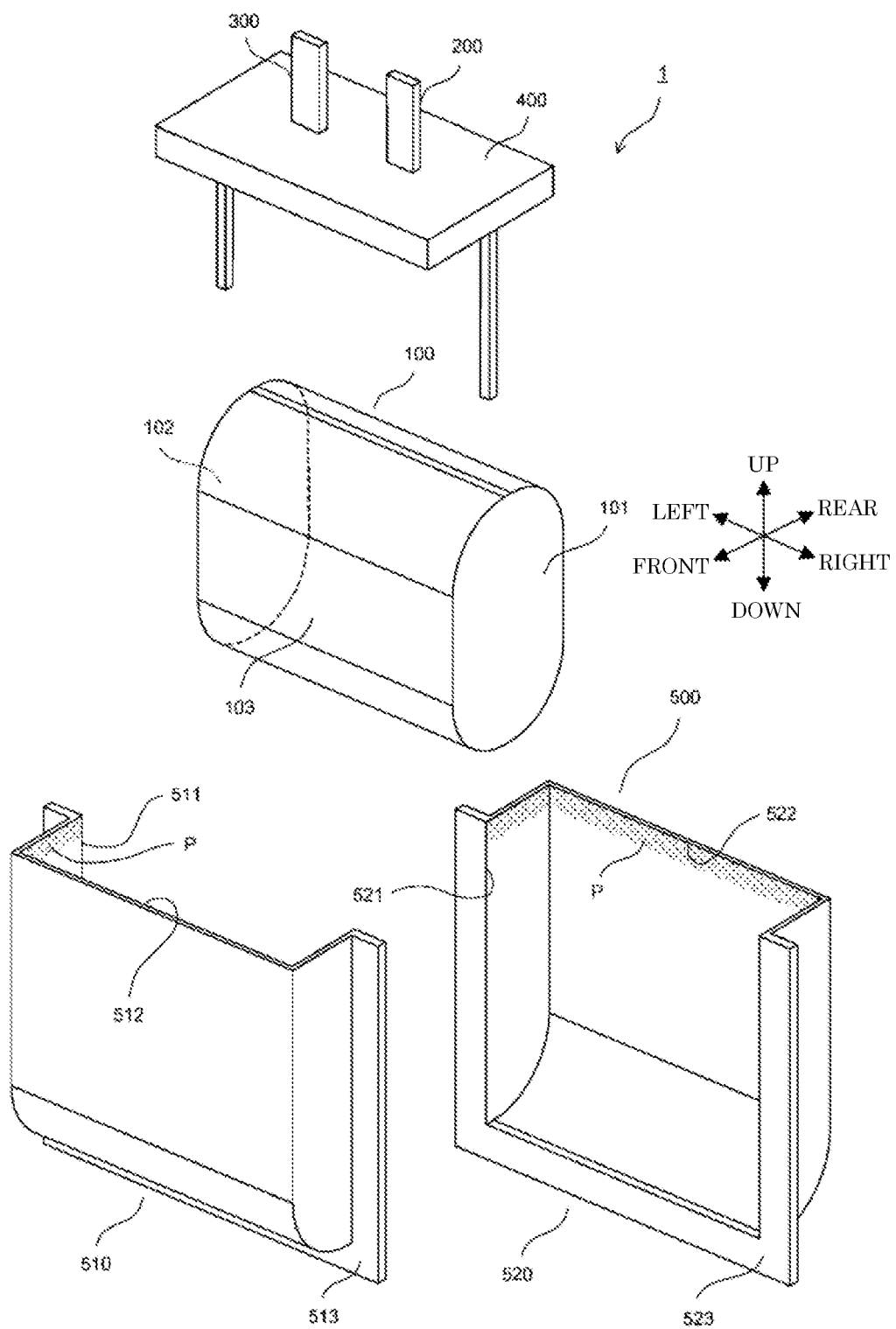
FIG. 10 is an exploded perspective view illustrating the film capacitor according to the second exemplary embodiment.
Figure 11A:
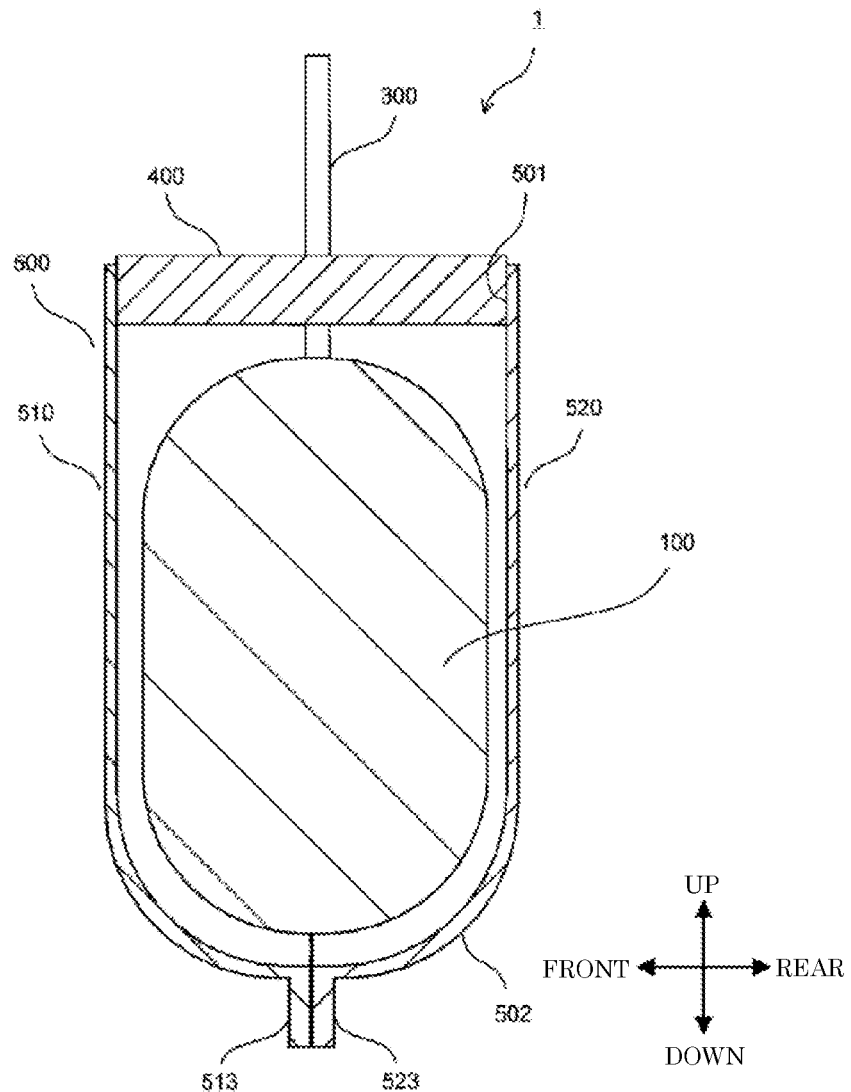
FIG. 11A is a side cross-sectional view illustrating the film capacitor according to the second exemplary embodiment cut at a middle of a capacitor element.
Figure 11B:
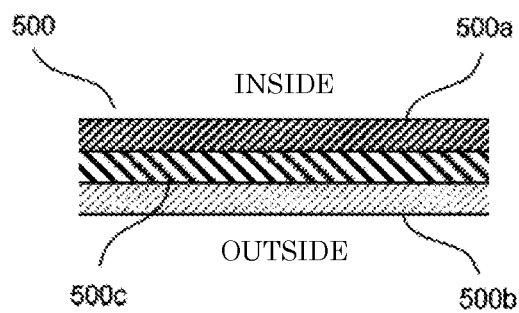
FIG. 11B is an enlarged cross-sectional view illustrating an exterior member according to the second exemplary embodiment.
Figure 12:
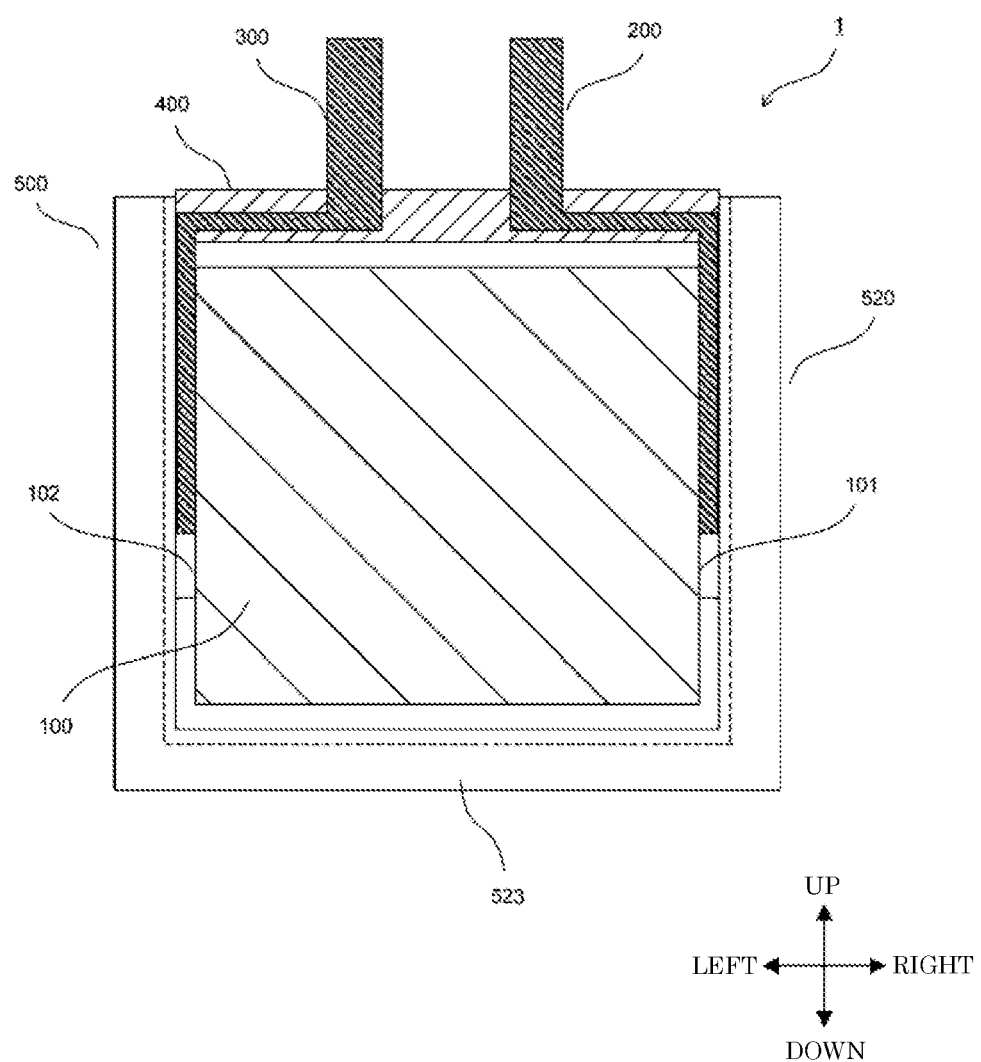
FIG. 12 is a front cross-sectional view illustrating the film capacitor according to the second exemplary embodiment cut at a joint between a first component and a second component.

FIG. 9 is a perspective view illustrating film capacitor 1 according to the present exemplary embodiment. FIG. 10 is an exploded perspective view illustrating film capacitor 1 according to the present exemplary embodiment. FIG. 11A is a side cross-sectional view illustrating film capacitor 1 according to the present exemplary embodiment cut at a middle of capacitor element 100, and FIG. 11B is an enlarged cross-sectional view illustrating exterior member 500 according to the present exemplary embodiment. FIG. 12 is a front cross-sectional view illustrating film capacitor 1 according to the present exemplary embodiment cut at a joint between first component 510 and second component 520. In FIGS. 9 to 12, exterior member 500 is illustrated in a large thickness for the sake of convenience. The same applies to FIG. 13A and subsequent drawings in which the thickness of exterior member 500 is shown.

Film capacitor 1 includes capacitor element 100, first bus bar 200, second bus bar 300, sealing plate 400, and exterior member 500.

Capacitor element 100 is formed by winding or laminating stacked metalized films, and pressing a wound body or a laminated body of the stacked metalized films into a flat shape. The stacked metalized films are formed by stacking two metalized films in each of which aluminum is deposited on a dielectric film. End faces of capacitor element 100 each have a substantially oval shape. In capacitor element 100, first end-face electrode 101 is formed on one of the end faces by spraying metal such as zinc, and similarly, second end-face electrode 102 is formed on the other end face by spraying metal such as zinc.

Capacitor element 100 of the present exemplary embodiment includes the metalized films in each of which aluminum is deposited on the dielectric film. Meanwhile, capacitor element 100 may include the metalized films in each of which other metal such as zinc and magnesium is deposited on the dielectric film. Alternatively, capacitor element 100 may include the metalized films in each of which a plurality of metals among such metals are deposited on the dielectric film or include the metalized films in each of which an alloy of such metals is deposited on the dielectric film.

Each of first bus bar 200 and second bus bar 300 is made of a conductive material such as copper. One end of first bus bar 200 is electrically connected to first end-face electrode 101 of capacitor element 100 by a connection method such as soldering or welding, and one end of second bus bar 300 is electrically connected to second end-face electrode 102 of capacitor element 100 by a connection method such as soldering or welding. Each of first bus bar 200 and second bus bar 300 is led out upward from capacitor element 100. First bus bar 200 is bent at a substantially right angle after extending along first end-face electrode 101, and extends inward (leftward) along capacitor element 100. And then first bus bar 200 is bent again at a substantially right angle to extend upward. Similarly, second bus bar 300 is bent at a substantially right angle after extending along second end-face electrode 102, and extends inward (rightward) along capacitor element 100. And then second bus bar 300 is bent again at a substantially right angle to extend upward.

Sealing plate 400 is made of a resin material such as polyphenylene sulfide (PPS) and has a rectangular plate shape. First bus bar 200 and second bus bar 300 pass through sealing plate 400. Sealing plate 400, first bus bar 200, and second bus bar 300 are integrally formed by insert molding so that any gap between these parts is less likely to be generated.

Exterior member 500 is a box having a substantially rectangular parallelepiped shape that is long in a right-left direction (a width direction of outer peripheral surface 103 of capacitor element 100) and short in a front-rear direction (a lateral direction of the end face of capacitor element 100). An upper surface of the exterior member has opening 501 having a rectangular shape that is long in the right-left direction. Meanwhile, lower end 502 of exterior member 500 has a circular arc shape corresponding to a lower part of outer peripheral surface 103 of capacitor element 100 which has a circular arc shape. Dimensions of opening 501 in the front-rear and right-left directions are substantially equal to dimensions of sealing plate 400 in the front-rear and right-left directions.

Exterior member 500 is formed of a metal laminate film that has, as shown in FIG. 11B, a three-layer structure including first resin layer 500a, second resin layer 500b, and metal layer 500c sandwiched between first resin layer 500a and second resin layer 500b. First resin layer 500a is, for example, made of polypropylene, whereas second resin layer 500b is, for example, made of nylon. Polypropylene is a resin that has a melting point lower than that of nylon. Metal layer 500c is, for example, made of aluminum foil. A thickness of exterior member 500 is approximately 100 µm. Exterior member 500 has low moisture permeability because of the presence of metal layer 500c, and is lightweight because of the small thickness.

Exterior member 500 includes first component 510 and second component 520, which are separable in the front-rear direction. First component 510 covers a front half (first portion) of capacitor element 100, and second component 520 covers a rear half (second portion) of capacitor element 100.

A rear surface of first component 510 is open as rear surface opening 511, and an upper surface of the first component is open as upper surface opening 512. A front surface of second component 520 is open as front surface opening 521, and an upper surface of the second component is open as upper surface opening 522. Upper surface opening 512 of first component 510 and upper surface opening 522 of second component 520 are joined together to constitute opening 501 of exterior member 500.

In first component 510, first flange 513 is formed as a tab for bonding so as to surround a left edge, a right edge, and a lower edge of rear surface opening 511. In second component 520, second flange 523 is formed as a tab for bonding so as to surround a left edge, a right edge, and a lower edge of front surface opening 521. First flange 513 and second flange 523 are overlapped each other in the front-rear direction, and a surface of first flange 513 and a surface of second flange 523 are bonded together.

A periphery of capacitor element 100, which is connected with first bus bar 200 and second bus bar 300, is covered with exterior member 500 such that opening 501 of exterior member 500 is sealed with sealing plate 400. A substantially entire part of sealing plate 400 is fit into opening 501. Adhesive P is applied to a part of an inner surface of exterior member 500 that comes into contact with four side faces of sealing plate 400 (see FIG. 10). Exterior member 500 and sealing plate 400 are bonded to each other with adhesive P. The other end of first bus bar 200 and the other end of second bus bar 300 are led out from exterior member 500 through opening 501 sealed with sealing plate 400.

Figure 13A:
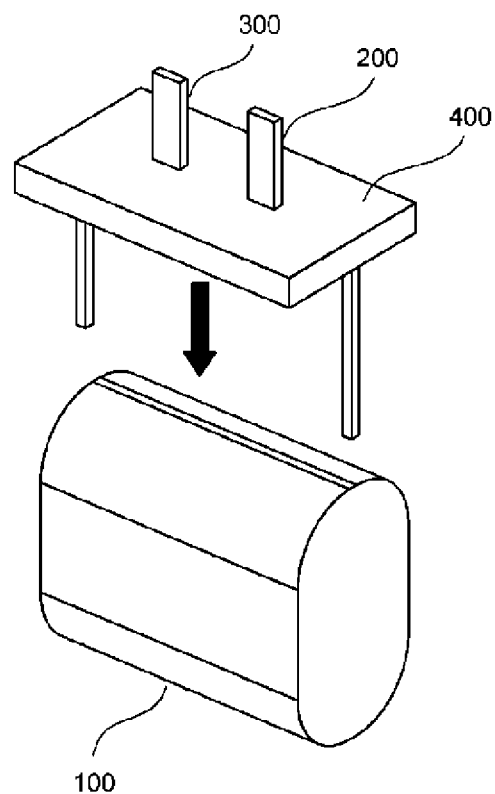
FIG. 13A is a drawing illustrating a step in a process of assembling the film capacitor according to the second exemplary embodiment.
Figure 13B:
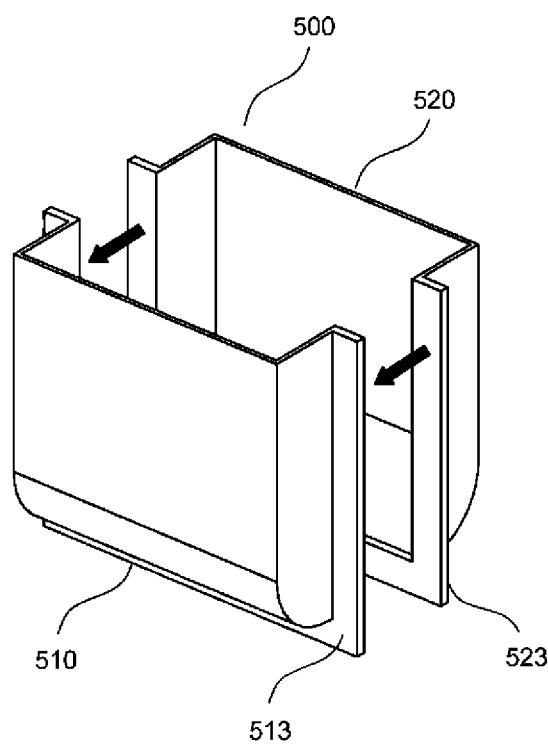
FIG. 13B is a drawing illustrating a step in the process of assembling the film capacitor according to the second exemplary embodiment.
Figure 13C:
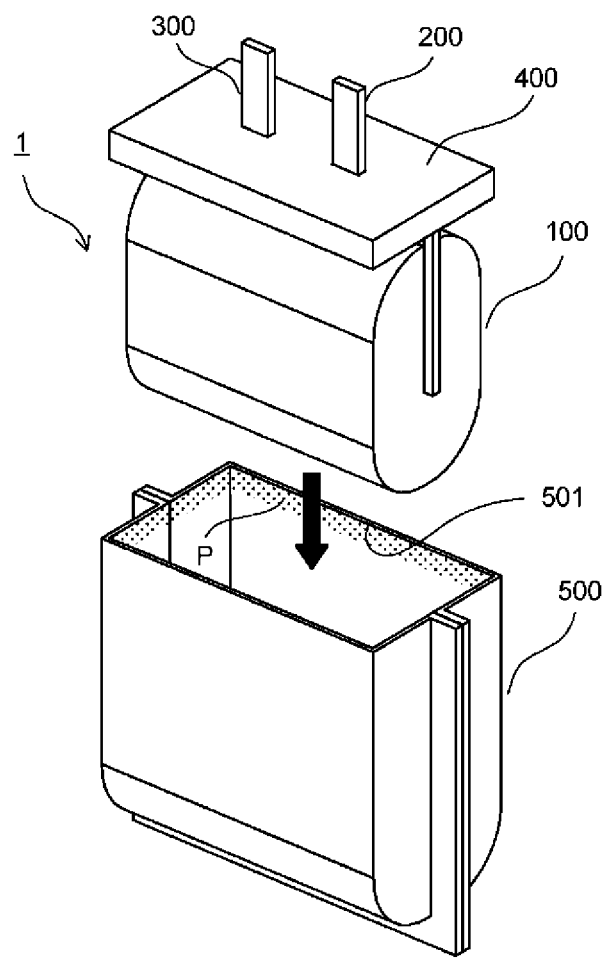
FIG. 13C is a drawing illustrating a step in the process of assembling the film capacitor according to the second exemplary embodiment.

FIGS. 13A to 13C are drawings illustrating steps in a process of assembling film capacitor 1 according to the present exemplary embodiment.

As shown in FIG. 13A, first bus bar 200 and second bus bar 300 which are integrated with sealing plate 400 by insert molding are connected to capacitor element 100. Meanwhile, as shown in FIG. 13B, first component 510 and second component 520 are joined together to complete exterior member 500. During this step, thermal welding is applied to first flange 513 and second flange 523 that are overlapped each other. First flange 513 and second flange 523 are bonded to each other by heat fusing first resin layers 500a of the first flange 513 and second flange 523.

Next, as shown in FIG. 13C, capacitor element 100 integrated with sealing plate 400 as well as first and second bus bars 200 and 300 is housed into an interior of exterior member 500 through opening 501. Capacitor element 100, a part of first bus bar 200, and a part of second bus bar 300 are covered with exterior member 500. Sealing plate 400 is fit into opening 501 and is bonded to the inner surface of exterior member 500 with adhesive P. In this way, opening 501 is sealed with sealing plate 400 such that the interior of exterior member 500 is hermetically sealed. Thus, as shown in FIG. 9, film capacitor 1 is completed.

<Effects of Second Exemplary Embodiment>

Film capacitor 1 configured according to the present exemplary embodiment can exhibit effects described below.

Capacitor element 100 is covered with exterior member 500 made of the metal laminate film. The metal laminate film has low moisture permeability because metal layer 500c is disposed between first resin layer 500a and second resin layer 500b. This enables exterior member 500 to exhibit an enhanced moisture interception effect. Hence, it is expected that the effect of preventing capacitor element 100 from absorbing moisture is improved.

Opening 501 through which a part of first bus bar 200 and a part of second bus bar 300 are led out from exterior member 500 is sealed with sealing plate 400 with which bus bar 200 and bus bar 300 are integrated and through which bus bars 200, 300 pass. This can ensure airtightness inside exterior member 500.

A part of first bus bar 200 and a part of second bus bar 300 are led out through identical opening 501. Hence, it is satisfactory that exterior member 500 has a sealing structure of sealing plate 400 for one direction in the periphery of capacitor element 100. Hence, as shown in the conventional technique, there is no concern about a decline in sealing performance by a defect in any of sealing structures for a plurality of directions such as two directions.

The film capacitor configured in this way according to the present exemplary embodiment is able to satisfactorily prevent capacitor element 100 from absorbing moisture.

Modified Examples of Second Exemplary Embodiment

The exemplary embodiment of the present disclosure has been described above, but the present disclosure is not limited to the exemplary embodiment described above. Application examples of the present disclosure can include various modifications in addition to the above exemplary embodiment.

Figure 14:
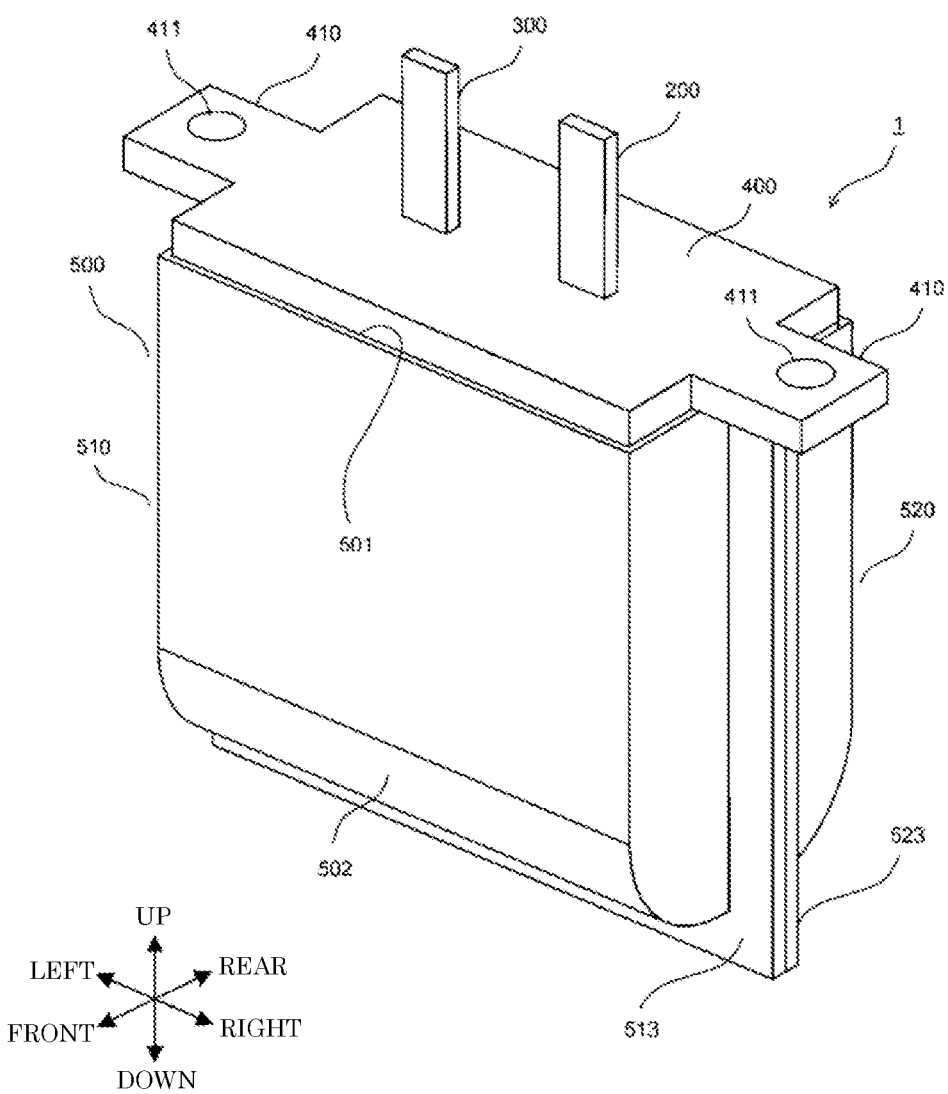
FIG. 14 is a perspective view illustrating a film capacitor according to a modified example of the second exemplary embodiment.

For instance, as shown in FIG. 14, sealing plate 400 may include attachment tabs 410. Attachment tabs 410 can be disposed, for example, on right end and left end of sealing plate 400. Attachment tabs 410 each have round attachment hole 411 that passes through in an up-down direction. Attachment tab 410 corresponds to an "attachment part" described in the appended claims Attachment tabs 410 may be disposed on front end and rear end of sealing plate 400.

Attachment tabs 410 are used to attach film capacitor 1 to an external device or other equipment. For instance, each of attachment tabs 410 is fastened to an attachment boss of the external device or other equipment with a screw passing through attachment hole 411.

When film capacitor 1 is configured such that capacitor element 100 is covered with exterior member 500 made of a metal laminate film, it is difficult to provide an attachment tab on exterior member 500. Hence, it could be a problem to attach film capacitor 1 to the external device or other equipment. In this modified example, opening 501 of exterior member 500 is sealed with sealing plate 400, and sealing plate 400 includes attachment tabs 410. Hence, film capacitor 1 including exterior member 500 made of a metal laminate film can be readily installed on the external device or other equipment.

In the exemplary embodiment described above, the four side faces of sealing plate 400 are bonded to the inner surface of exterior member 500 by using adhesive P. In order to improve sealing performance between sealing plate 400 and exterior member 500, a film capacitor may have a configuration shown in a modified example of FIG. 15A or FIG. 15B.

Figure 15A:
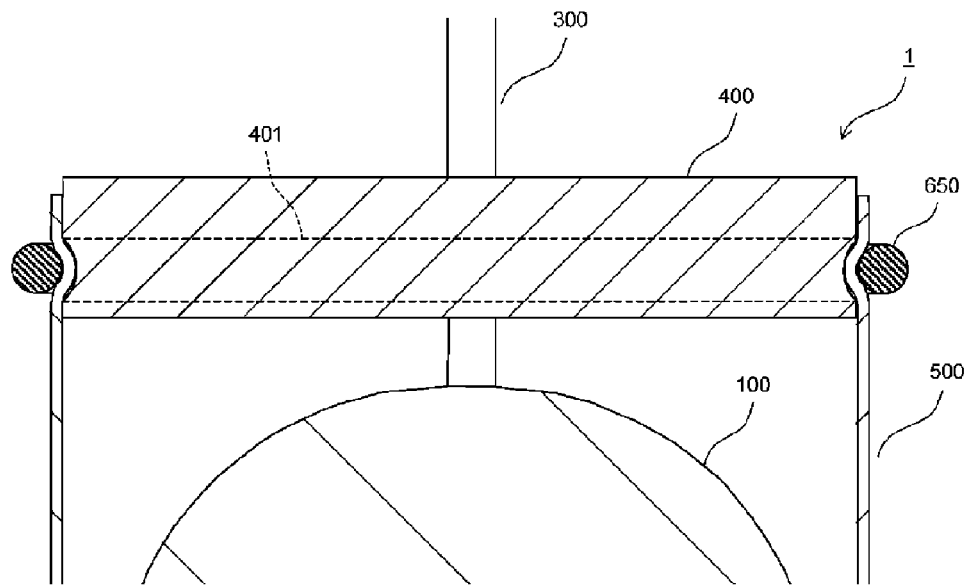
FIG. 15A is a side cross-sectional view illustrating a principal part of a film capacitor according to a modified example of the second exemplary embodiment.

In the modified example of FIG. 15A, in the same way as the above-described exemplary embodiment, the four side faces of sealing plate 400 are bonded to the inner surface of exterior member 500 by using adhesive P. Further, in this modified example, arc-shaped groove 401 denting inward is formed in the four side faces of sealing plate 400. O-ring 650 made of rubber is disposed on an area of an outer periphery of exterior member 500 which corresponds to a position of groove 401. The area is located in a part of the outer periphery of exterior member 500 which overlaps sealing plate 400. Since O-ring 650 is mounted on exterior member 500 in a condition that O-ring 650 is stretched by elasticity, O-ring 650 tighten inward a part of exterior member 500 that is put into contact with O-ring 650. The part of exterior member 500 tightened with O-ring 650 is deformed so as to be bent inward and is fit into groove 401 in sealing plate 400. This increases adhesiveness between sealing plate 400 and exterior member 500, and thus improves sealing performance between sealing plate 400 and exterior member 500. In this modified example, first flange 513 of first component 510 and second flange 523 of second component 520 may be disposed beneath a position of O-ring 650 in order to avoid interference with O-ring 650.

O-ring 650 in this modified example corresponds to a "tightening member" described in the appended claims A component other than O-ring 650, such as a band-shaped fastening metal part, may be used as a tightening member.

Figure 15B:
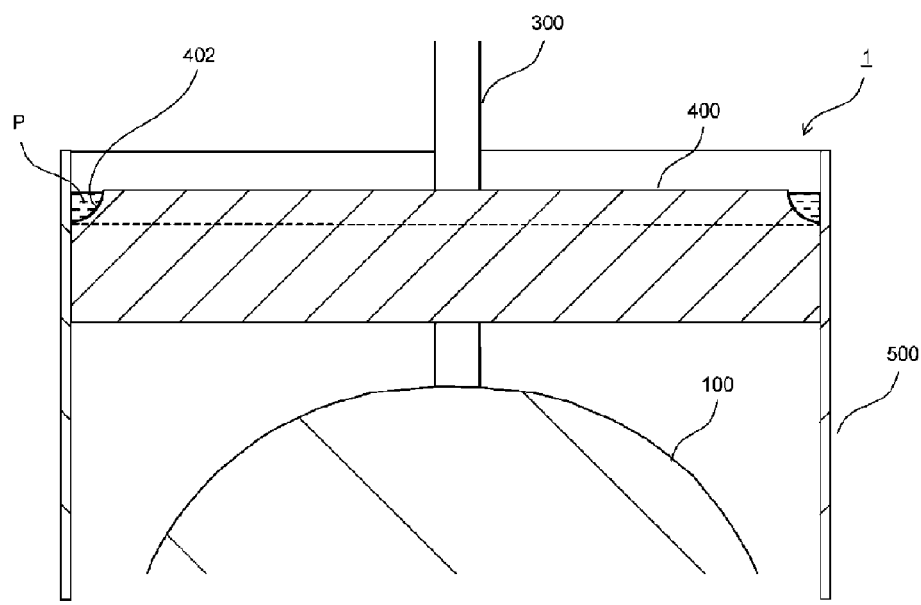
FIG. 15B is a side cross-sectional view illustrating a principal part of a film capacitor according to a modified example of the second exemplary embodiment.

Next, in the modified example of FIG. 15B, sealing plate 400 is fit into opening 501 such that an upper surface of the sealing plate is disposed below a top edge of the opening of exterior member 500. An outer peripheral edge of sealing plate 400 is dented, and the dented outer peripheral edge and a periphery of opening 501 form groove 402. Adhesive P is deposited in groove 402. In this configuration, sealing plate 400 and exterior member 500 are reliably bonded together through a region of groove 402. Adhesive P deposited in groove 402 partially flows into a gap between the side faces of sealing plate 400 and the inner surface of exterior member 500 below groove 402. Hence, sealing plate 400 and exterior member 500 are bonded together. Thus, the configuration of this modified example enhances a bonding effect of adhesive P. Thus, sealing performance between sealing plate 400 and exterior member 500 can be improved.

In this modified example, sealing plate 400 is fit into opening 501 such that the upper surface of the sealing plate is disposed below the top edge of the opening of exterior member 500. This is intended to ensure that groove 402 is readily formed by the dented outer peripheral edge and the periphery of opening 501, and that adhesive P flowing into groove 402 is less likely to leak out of exterior member 500. Meanwhile, as long as groove 402 is allowed to be formed, sealing plate 400 may be fit into opening 501 such that the upper surface of sealing plate 400 is as high as or slightly higher than the top edge of the opening of exterior member 500.

Figure 16:
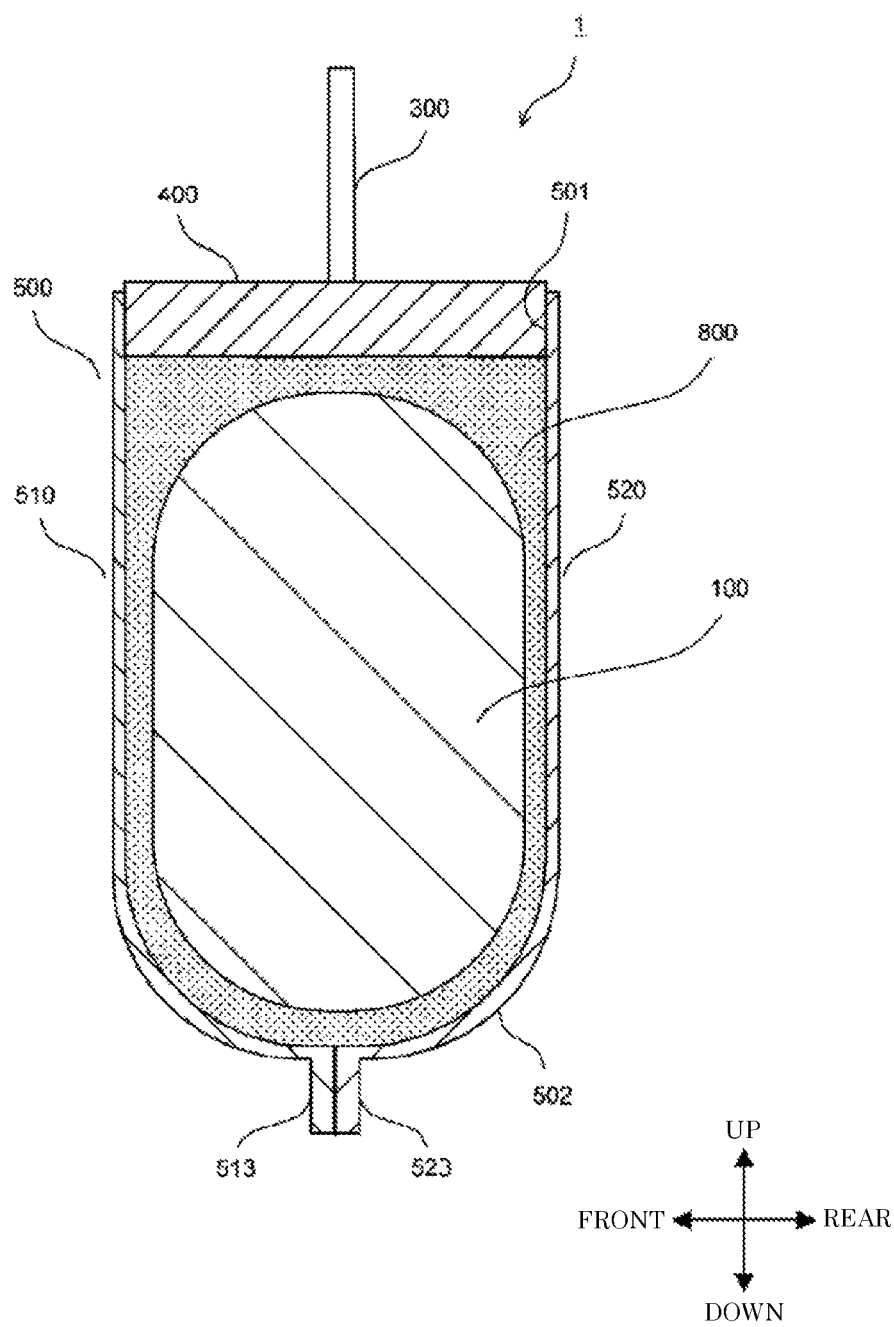
FIG. 16 is a side cross-sectional view illustrating a film capacitor according to a modified example of the second exemplary embodiment cut at a middle of a capacitor element.

As shown in FIG. 16, an interior of exterior member 500, which covers capacitor element 100 and other parts, may be filled with filler resin 800. Filler resin 800 includes a thermosetting resin such as an epoxy resin. In this case, in order to avoid an overflow of filler resin 800 when capacitor element 100 and other parts are housed into exterior member 500, molten filler resin 800 is injected into exterior member 500 in a quantity that factors in a volume of capacitor element 100 and other parts, for example. Next, capacitor element 100 and other parts are housed into the interior of exterior member 500 through opening 501 such that a periphery of capacitor element 100 and other parts are filled with filler resin 800. After that, exterior member 500 is heated to cure filler resin 800 inside.

According to this configuration, capacitor element 100 is covered with filler resin 800 as well as exterior member 500. Thus, filler resin 800 also intercepts moisture. This configuration is expected to further improve the effect of preventing capacitor element 100 from absorbing moisture. Even if there is a part inadequately welded between first flange 513 and second flange 523 which are thermally welded, filler resin 800 gets into a gap of the part to ensure sealing performance.

Figure 17A:
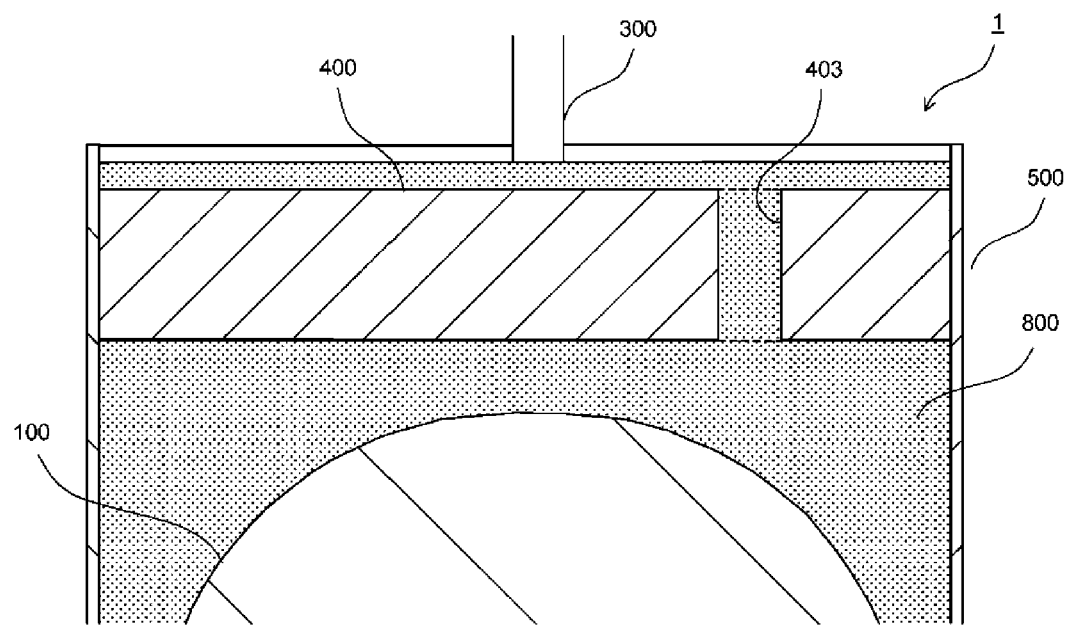
FIG. 17A is a side cross-sectional view illustrating a principal part of a film capacitor according to a modified example of the second exemplary embodiment.
Figure 17B:
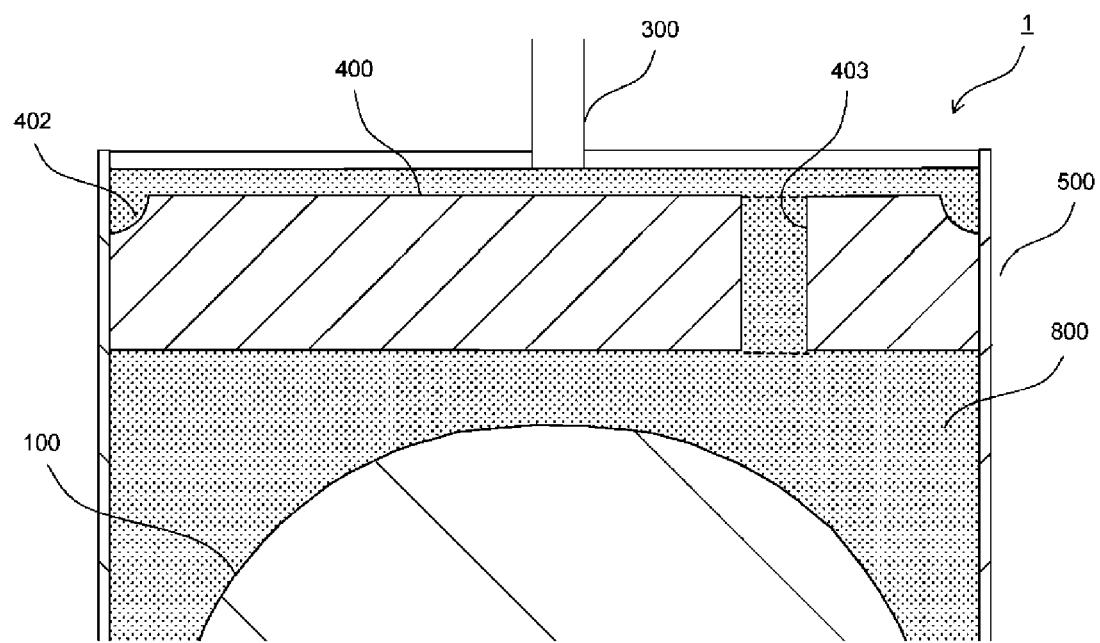
FIG. 17B is a side cross-sectional view illustrating a principal part of a film capacitor according to a modified example of the second exemplary embodiment.

As shown in FIG. 17A, injection port 403 may be formed in sealing plate 400. In this case, filler resin 800 is injected through injection port 403 into the interior of exterior member 500 housing capacitor element 100 and other parts. In this case, as shown in FIG. 17A, when sealing plate 400 is fit into opening 501 such that the upper surface of the sealing plate is disposed below the top edge of the opening of exterior member 500, filler resin 800 overflown from injection port 403 is deposited on sealing plate 400. Thus, deposited filler resin 800 is used to improve sealing performance between the side faces of sealing plate 400 and the inner surface of exterior member 500. As shown in FIG. 17B, if groove 402 is formed in a similar way to the modified example of FIG. 15B, overflown filler resin 800 can be satisfactorily deposited in groove 402. This configuration further improves sealing performance between the side faces of sealing plate 400 and the inner surface of exterior member 500.

The modified examples of FIGS. 14 to 17B may be combined as appropriate. In particular, when the interior of exterior member 500 in the modified example of FIG. 14 is filled with filler resin 800 as shown in FIG. 16, adhesive P may be applied to a lower surface of sealing plate 400. This allows filler resin 800 to be bonded to sealing plate 400. Hence, sealing plate 400, which is attached to the external device or other equipment by means of attachment tabs 410, can hold filler resin 800 directly rather than through capacitor element 100 or exterior member 500.

In the exemplary embodiment described above, exterior member 500 is divided into two parts, which are first component 510 and second component 520, in the front-rear direction. Meanwhile, a direction in which exterior member 500 is divided is not limited to the direction described above. For instance, exterior member 500 may be divided into two parts, which are first component 510 and second component 520, in the up-down direction. Exterior member 500 may be divided into two parts, which are first component 510 and second component 520, in the right-left direction.

In the exemplary embodiment described above, first flange 513 of first component 510 and second flange 523 of second component 520 are thermally welded together. Meanwhile, first flange 513 and second flange 523 may be bonded to each other with an adhesive. In this modified example, in contrast to the case where thermal welding is performed, it may not be necessarily that first resin layer 500a is made of a resin material having low melting point, and second resin layer 500b is made of a resin material having high melting point. Hence, in first component 510 and second component 520, first resin layer 500a and second resin layer 500b may be made of the same resin material each other. For instance, both first resin layer 500a and second resin layer 500b may be made of nylon.

Third Exemplary Embodiment

A third exemplary embodiment of the present disclosure will be described below with reference to the accompanying drawings. For the sake of convenience, directions including front and rear, right and left, and up and down are added to the drawings as appropriate. These directions in the drawings are not absolute directions but relative directions of film capacitor 1 and components.

In the exemplary embodiment, film capacitor 1 corresponds to a "capacitor" described in the appended claims First end-face electrode 101 and second end-face electrode 102 each correspond to an "electrode" described in the claims. Coating part 460 corresponds to a "coating layer" described in the claims.

However, the above description is only intended to define correspondences between constituents shown in the appended claims and constituents shown in the exemplary embodiment. The correspondences described above should not be construed to limit the scope of the present disclosure described in the appended claims to the configuration described in the exemplary embodiment.

Figure 18A:
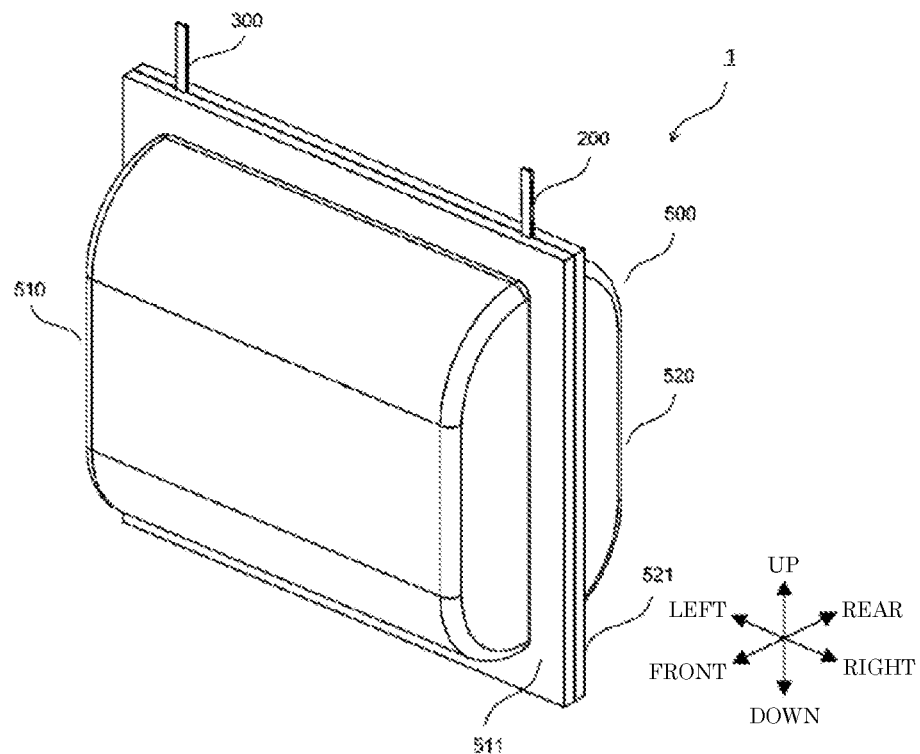
FIG. 18A is a perspective view illustrating a film capacitor according to a third exemplary embodiment.
Figure 18B:
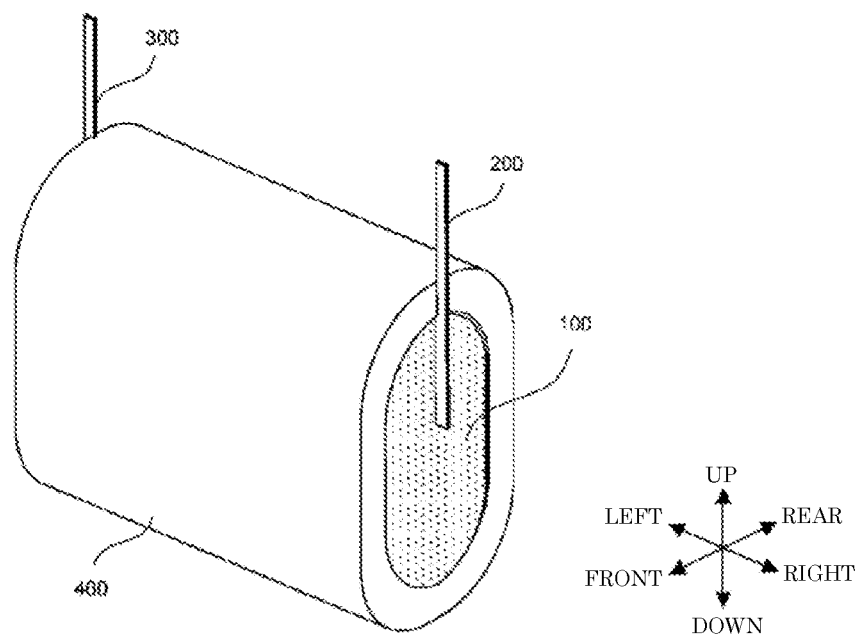
FIG. 18B is a perspective view illustrating the film capacitor according to the third exemplary embodiment without an exterior member.
Figure 19:
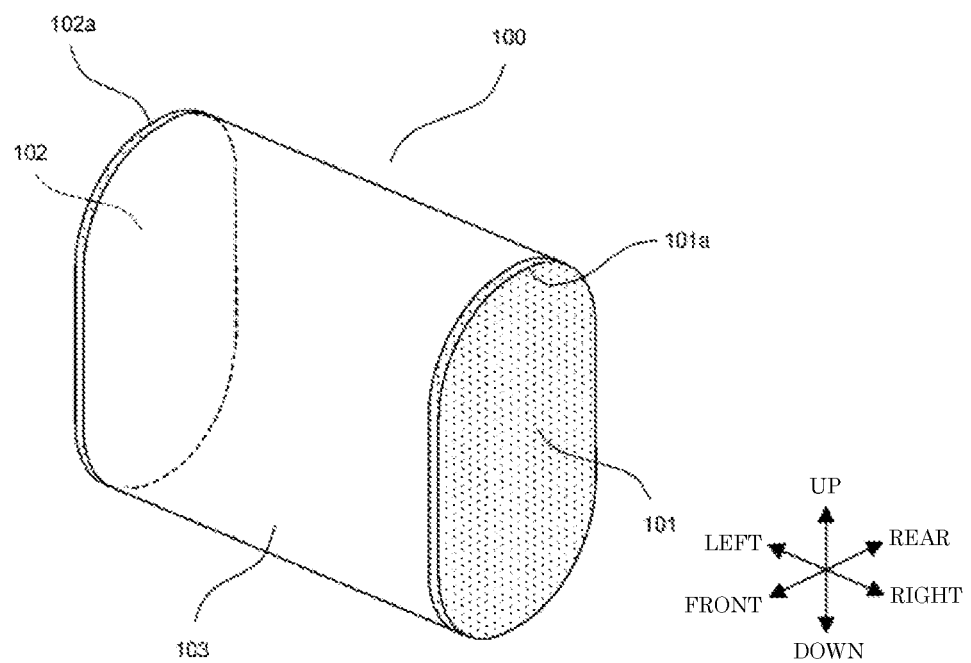
FIG. 19 is a perspective view illustrating a capacitor element according to the third exemplary embodiment.
Figure 20A:
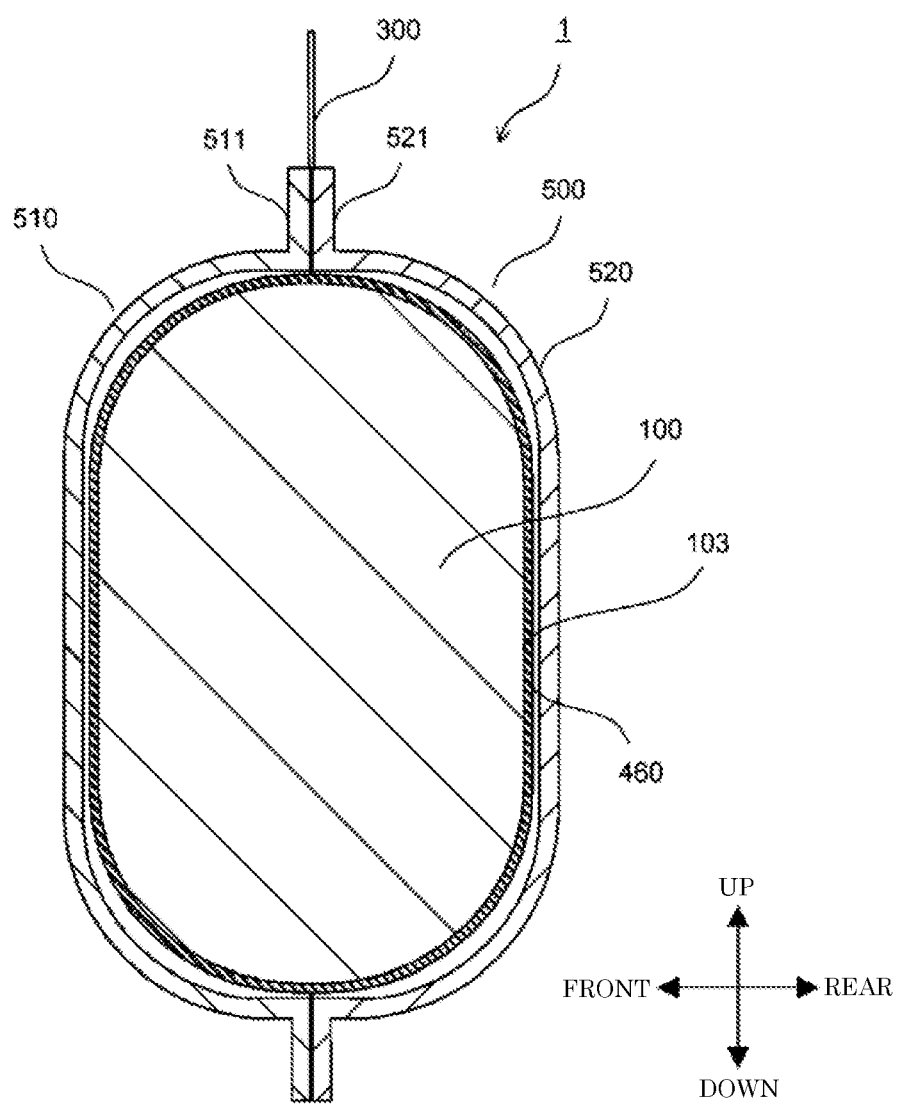
FIG. 20A is a side cross-sectional view illustrating the film capacitor according to the third exemplary embodiment cut at a middle of the capacitor element.
Figure 20B:
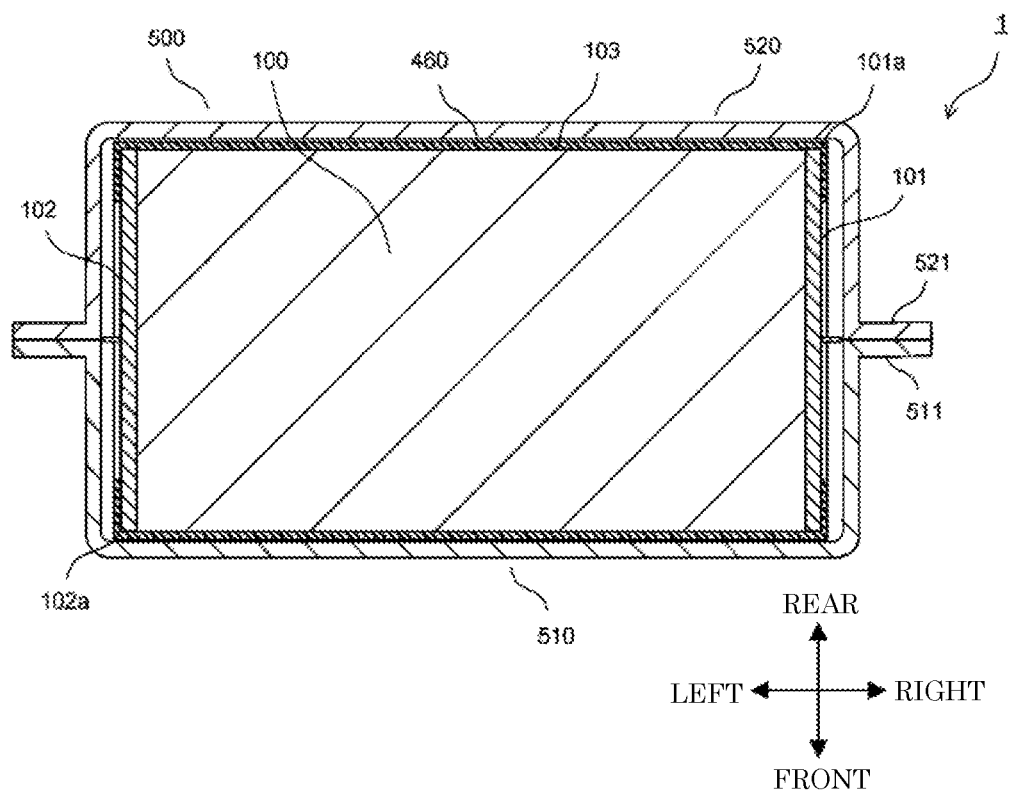
FIG. 20B is a plan cross-sectional view illustrating the film capacitor according to the third exemplary embodiment cut at a middle of the capacitor element.
Figure 20C:
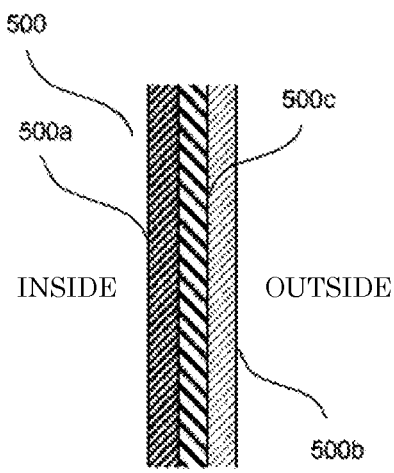
FIG. 20C is an enlarged cross-sectional view illustrating the exterior member according to the third exemplary embodiment.

FIG. 18A is a perspective view illustrating film capacitor 1 according to the present exemplary embodiment, and FIG. 18B is a perspective view illustrating film capacitor 1 according to the present exemplary embodiment without exterior member 500. FIG. 19 is a perspective view illustrating capacitor element 100 according to the present exemplary embodiment. FIG. 20A is a side cross-sectional view illustrating film capacitor 1 according to the present exemplary embodiment cut at a middle of capacitor element 100. FIG. 20B is a cross-sectional plan view illustrating film capacitor 1 according to the present exemplary embodiment cut at a middle of capacitor element 100, and FIG. 20C is an enlarged cross-sectional view illustrating exterior member 500 according to the present exemplary embodiment. In FIGS. 18A to 20C, exterior member 500 is illustrated in a large thickness for the sake of convenience. The same applies to FIG. 21 and subsequent drawings in which the thickness of exterior member 500 is shown.

Film capacitor 1 includes capacitor element 100, first bus bar 200, second bus bar 300, coating part 460, and exterior member 500.

As shown in FIG. 19, capacitor element 100 includes a capacitor body and an exterior film. The exterior film, which has an electrical insulating property, is wound around an outer peripheral surface of the capacitor body a plurality of times (a plurality of turns). The capacitor body is formed by winding or laminating stacked metalized films, and pressing a wound body or a laminated body of the stacked metalized films into a flat shape. The stacked metalized films are formed by stacking two metalized films in each of which aluminum is deposited on a dielectric film. End faces of capacitor element 100 each have a substantially oval shape. In capacitor element 100, first end-face electrode 101 is formed on one of the end faces by spraying metal such as zinc, and similarly, second end-face electrode 102 is formed on the other end face by spraying metal such as zinc. Each of outer peripheral edge 101a of first end-face electrode 101 and outer peripheral edge 102a of second end-face electrode 102 is angular and relatively sharp.

Capacitor element 100 of the exemplary embodiment includes the metalized films in each of which aluminum is deposited on the dielectric film. Meanwhile, capacitor element 100 may include the metalized films in each of which other metal such as zinc and magnesium is deposited on the dielectric film. Alternatively, capacitor element 100 may include the metalized films in each of which a plurality of metals among such metals are deposited on the dielectric film or include the metalized films in each of which an alloy of such metals is deposited on the dielectric film.

Each of first bus bar 200 and second bus bar 300 is made of a conductive material such as copper, and has a slender rectangular plate shape. One end of first bus bar 200 is electrically connected to first end-face electrode 101 of capacitor element 100 by a connection method such as soldering or welding, and one end of second bus bar 300 is electrically connected to second end-face electrode 102 of capacitor element 100 by a connection method such as soldering or welding. Each of first bus bar 200 and second bus bar 300 is led out upward from capacitor element 100.

Coating part 460 includes a thermal conductive sheet having an electrical insulating property, and thus is excellent in electrical insulation and thermal conductivity. In capacitor element 100, coating part 460 covers, as a coating layer, entire outer peripheral surface 103 as well as outer peripheral edge 101a of first end-face electrodes 101 and outer peripheral edge 102a of second end-face electrode 102. A thickness of coating part 460 may be, for example, approximately 300 μm.

Coating part 460 can be, for example, mounted on an exterior of capacitor element 100 by winding a cut sheet along outer peripheral surface 103 of capacitor element 100, and bending both side ends lying off the outer peripheral surface over first end-face electrode 101 and second end-face electrode 102. The cut sheet is formed by cutting the sheet into a body that is greater in width than capacitor element 100 in the right-left direction. An adhesive is applied in advance to a surface of coating part 460 that comes into contact with capacitor element 100. Coating part 460 is integrated with capacitor element 100 by this adhesive. Preferably, the adhesive has high thermal conductivity. It is preferred that coating part 460 have flexibility. This enables coating part 460 to cover entire outer peripheral surface 103 of capacitor element 100 as well as outer peripheral edge 101a of first end-face electrode 101 and outer peripheral edge 102a of second end-face electrode 102 such that the coating part adapts to shapes of these parts.

A periphery of capacitor element 100, which is covered with coating part 460 and is connected with first bus bar 200 and second bus bar 300, is covered with exterior member 500.

An external shape of exterior member 500 is substantially analogous to an external shape of capacitor element 100, i.e., an elliptic cylinder in the shape of a box. Exterior member 500 includes a metal laminate film that has, as shown in FIG. 20C, a three-layer structure including first resin layer 500a, second resin layer 500b, and metal layer 500c sandwiched between first resin layer 500a and second resin layer 500b. First resin layer 500a is, for example, made of polypropylene, whereas second resin layer 500b is, for example, made of nylon. Polypropylene is a resin that has a melting point lower than that of nylon. Metal layer 500c is, for example, made of aluminum foil. A thickness of exterior member 500 is approximately 100 μm. Exterior member 500 has low moisture permeability because of the presence of metal layer 500c, and is lightweight because of the small thickness.

Exterior member 500 includes first component 510 and second component 520, which are separable in the front-rear direction. First component 510 covers a front half (first portion) of capacitor element 100, and second component 520 covers a rear half (second portion) of capacitor element 100. First component 510 has first flange 511 that is formed at outer peripheral edge of first component 510 to act as a tab for bonding. And second component 520 has second flange 521 that is formed at outer peripheral edge of second component 520 to act as a tab for bonding. First flange 511 and second flange 521 are overlapped each other in the front-rear direction, and a surface of first flange 511 and a surface of second flange 521 are thermally welded together or bonded together with an adhesive.

The other end of first bus bar 200 and the other end of second bus bar 300 are led out of exterior member 500 through between first flange 511 and second flange 521. Each of first bus bar 200 and second bus bar 300 is connected to capacitor element 100 and is disposed such that a thickness direction in which each of first bus bar 200 and second bus bar 300 has a smallest thickness is identical to a junction direction in which first flange 511 and second flange 521 are joined together. Hence, a gap is less likely to be generated between each of first bus bar 200 and second bus bar 300 and each of first flange 511 and second flanges 521. Any of the generated gaps are filled with an adhesive or a sealant. This configuration prevents air from coming in and out through lead-out portions of exterior member 500 for first bus bar 200 and second bus bar 300. Thus, airtightness inside exterior member 500 can be maintained. In this way, since capacitor element 100 is hermetically covered with exterior member 500, the film capacitor is able to prevent capacitor element 100 from absorbing moisture.

As shown in FIGS. 20A and 20B, capacitor element 100 is covered with exterior member 500 such that almost no gap is generated between the capacitor element and an inner surface of exterior member 500. In other words, a part of coating part 460 on outer peripheral surface 103 of capacitor element 100 is in contact with or extremely close to the inner surface of exterior member 500. And a part of coating part 460 on each of first end-face electrode 101 and second end-face electrode 102 of capacitor element 100 is separated from the inner surface of exterior member 500 by a dimension of corresponding one of first bus bar 200 and second bus bar 300.

When the gap between capacitor element 100 and the inner surface of exterior member 500 is small, edge 101a of first end-face electrode 101 and edge 102a of second end-face electrode 102 are readily come into contact with the inner surface of exterior member 500, i.e., first resin layer 500a of exterior member 500. Since edge 101a of first end-face electrodes 101 and edge 102a of second end-face electrode 102 are relatively sharp as described above, first resin layer 500a may be damaged to break by direct contact of the edges with first resin layer 500a. First resin layer 500a secures electrical insulation between capacitor element 100 and metal layer 500c of exterior member 500. Thus, a break in first resin layer 500a disrupts the electrical insulation.

In the present exemplary embodiment, edge 101a of first end-face electrodes 101 and edge 102a of second end-face electrode 102 are covered with coating part 460. Thus, edge 101a and edge 102a do not directly come into contact with the inner surface of exterior member 500, and first resin layer 500a of exterior member 500 is less likely to be damaged by edge 101a and edge 102a. In this way, electrical insulation between capacitor element 100 and metal layer 500c of exterior member 500 can be satisfactorily secured.

In the present exemplary embodiment, outer peripheral surface 103 of capacitor element 100 as well as edge 101a of first end-face electrode 101 and edge 102a of second end-face electrode 102 are covered with coating part 460. When film capacitor 1 is energized or in another similar state, heat generated from capacitor element 100 is effectively transferred to exterior member 500 through coating part 460 and is dissipated out of exterior member 500 because coating part 460 is excellent in thermal conductivity. Hence, capacitor element 100 is less likely to overheat.

<Effects of Third Exemplary Embodiment>

Film capacitor 1 configured according to the present exemplary embodiment can exhibit effects described below.

Capacitor element 100 is covered with exterior member 500 made of the metal laminate film. The metal laminate film has low moisture permeability because metal layer 500c is disposed between first resin layer 500a and second resin layer 500b. This enables exterior member 500 to exhibit an enhanced moisture interception effect. Hence, it is expected that the effect of preventing capacitor element 100 from absorbing moisture is improved.

Edge 101a of first end-face electrode 101 and edge 102a of second end-face electrode 102 of capacitor element 100 are covered with coating part 460. Thus, first resin layer 500a of exterior member 500 is less likely to be damaged by edge 101a and edge 102a. Hence, electrical insulation between capacitor element 100 and metal layer 500c of exterior member 500 can be satisfactorily secured.

Since coating part 460 is excellent in thermal conductivity and is also used to cover outer peripheral surface 103 of capacitor element 100, heat generated from capacitor element 100 is effectively transferred to exterior member 500 through coating part 460 and is dissipated out of exterior member 500. This improves the effect of preventing capacitor element 100 from overheating.

Modified Examples of Third Exemplary Embodiment

The exemplary embodiment of the present disclosure has been described above, but the present disclosure is not limited to the exemplary embodiment described above. Application examples of the present disclosure can include various modifications in addition to the above exemplary embodiment.

Figure 21:
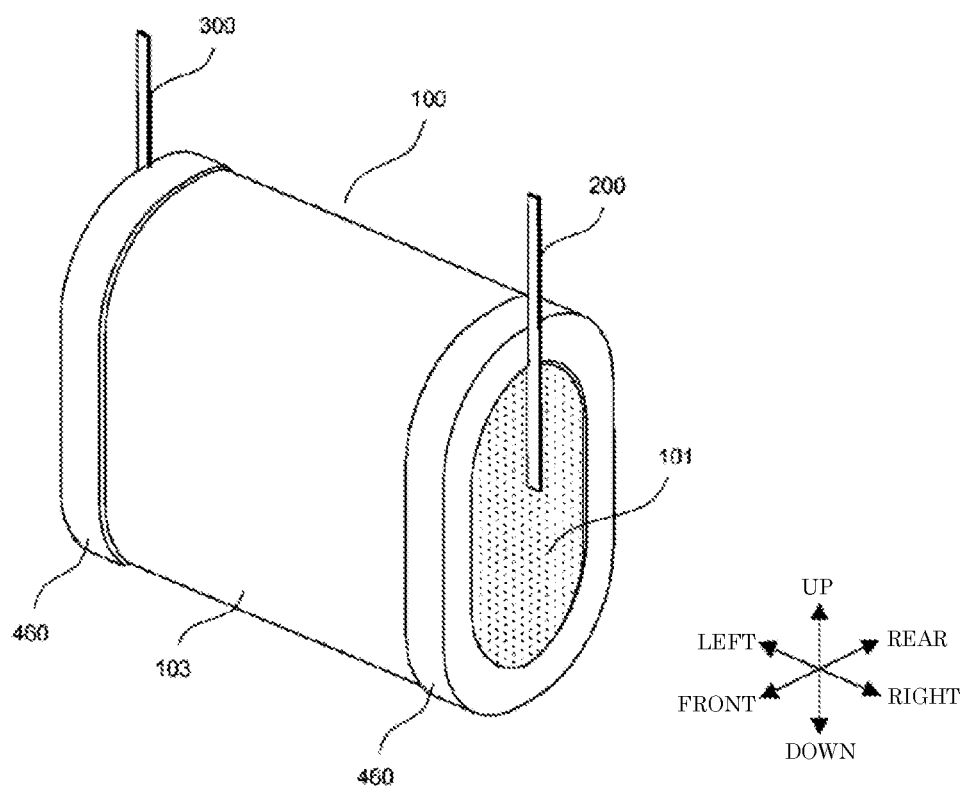
FIG. 21 is a perspective view illustrating a film capacitor according to a modified example of the third exemplary embodiment without an exterior member.

For instance, in the exemplary embodiment described above, coating part 460 is made of a thermal conductive sheet having an electrical insulating property. Meanwhile, coating part 460 may be made of a material (a sheet material) having non-high thermal conductivity while possessing an electrical insulating property. In this case, as shown in FIG. 21, it is satisfactory that edge 101a of first end-face electrode 101 and edge 102a of second end-face electrode 102 may be only covered with coating part 460, and most of outer peripheral surface 103 of capacitor element 100 may not be covered. Even when coating part 460 is made of a thermal conductive sheet having an electrical insulating property, it may not be necessarily that outer peripheral surface 103 is not entirely covered with coating part 460. More than half of outer peripheral surface 103 or most of outer peripheral surface 103 may be covered with coating part 460.

In the exemplary embodiment described above, exterior member 500 is configured such that first bus bar 200 and second bus bar 300 are led out through a boundary between first flange 511 and second flange 521. Meanwhile, film capacitor 1 may have a modified configuration shown in FIGS. 22A and 22B.

Figure 22A:
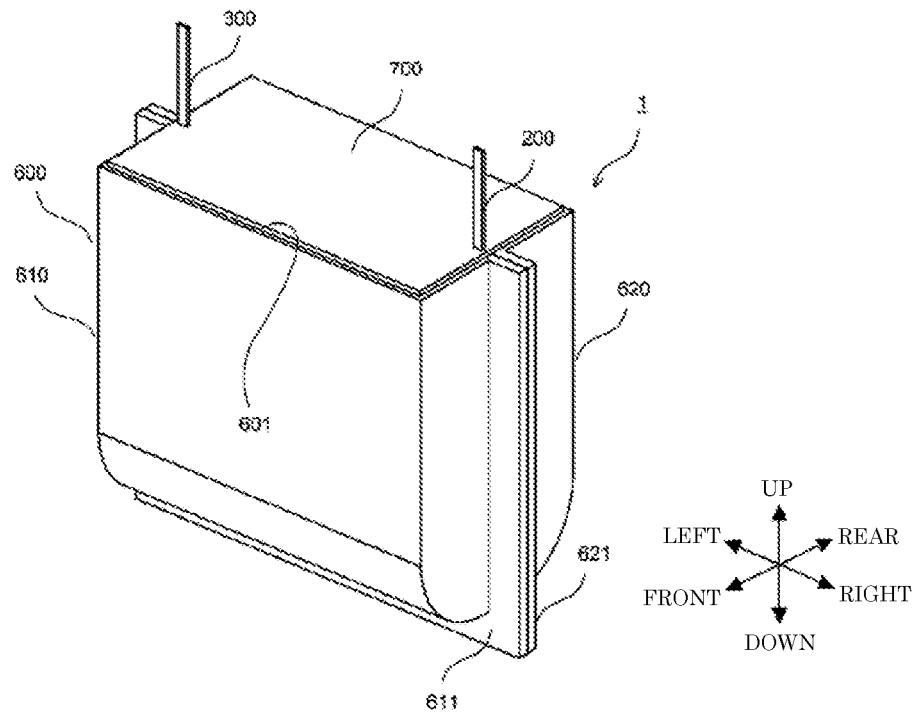
FIG. 22A is a perspective view illustrating a film capacitor according to a modified example of the third exemplary embodiment.
Figure 22B:
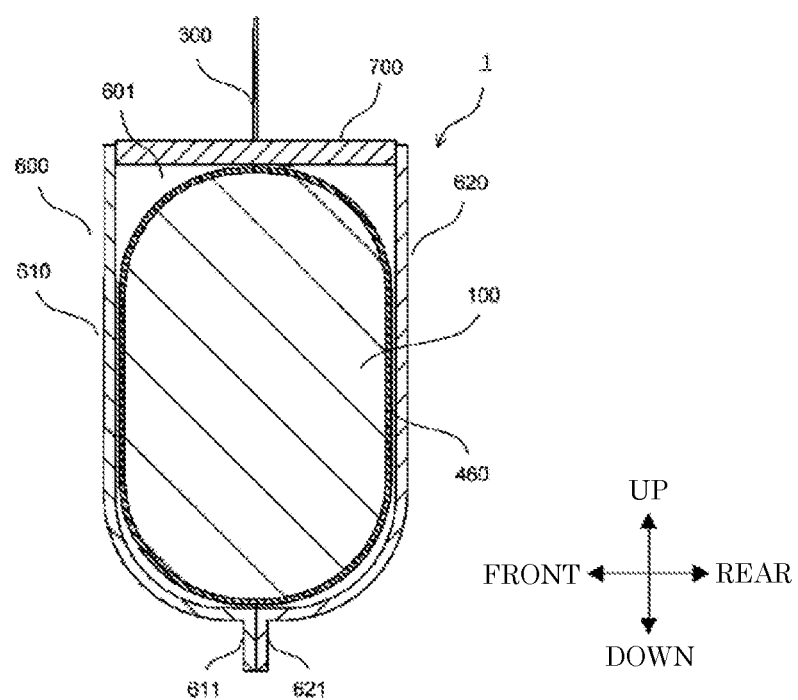
FIG. 22B is a side cross-sectional view illustrating the film capacitor according to the modified example of the third exemplary embodiment cut at a middle of a capacitor element.

In the modified example of FIGS. 22A and 22B, film capacitor 1 includes exterior member 600 and sealing plate 700 in place of exterior member 500.

Exterior member 600 includes a metal laminate film and is a box having a substantially rectangular parallelepiped shape. A lower end of exterior member 600 has a circular arc shape. An upper surface of exterior member 600 has opening 601 having a rectangular shape. Exterior member 600 includes first component 610 and second component 620. First component 610 and second component 620 respectively have flange 611 and flange 621 which are thermally welded together or bonded together with an adhesive.

Sealing plate 700 is made of a resin material such as polyphenylene sulfide (PPS) and has a rectangular plate shape. First bus bar 200 and second bus bar 300 pass through sealing plate 700. Sealing plate 700, first bus bar 200, and second bus bar 300 are integrally formed by insert molding so that any gap between these parts is less likely to be generated.

Opening 601 of exterior member 600 is sealed with sealing plate 700. Sealing plate 700 is fixed to exterior member 600 with an adhesive, for example. Thus, capacitor element 100 covered with coating part 460 is hermetically covered with exterior member 600 and sealing plate 700.

Sealing plate 700 may be integrated with an attachment tab that is used to attach film capacitor 1 to an external device or other equipment. For instance, the attachment tab of sealing plate 700 has an attachment hole and is fastened to an attachment boss formed on the external device or other equipment with a screw passing through the attachment hole.

Figure 23:
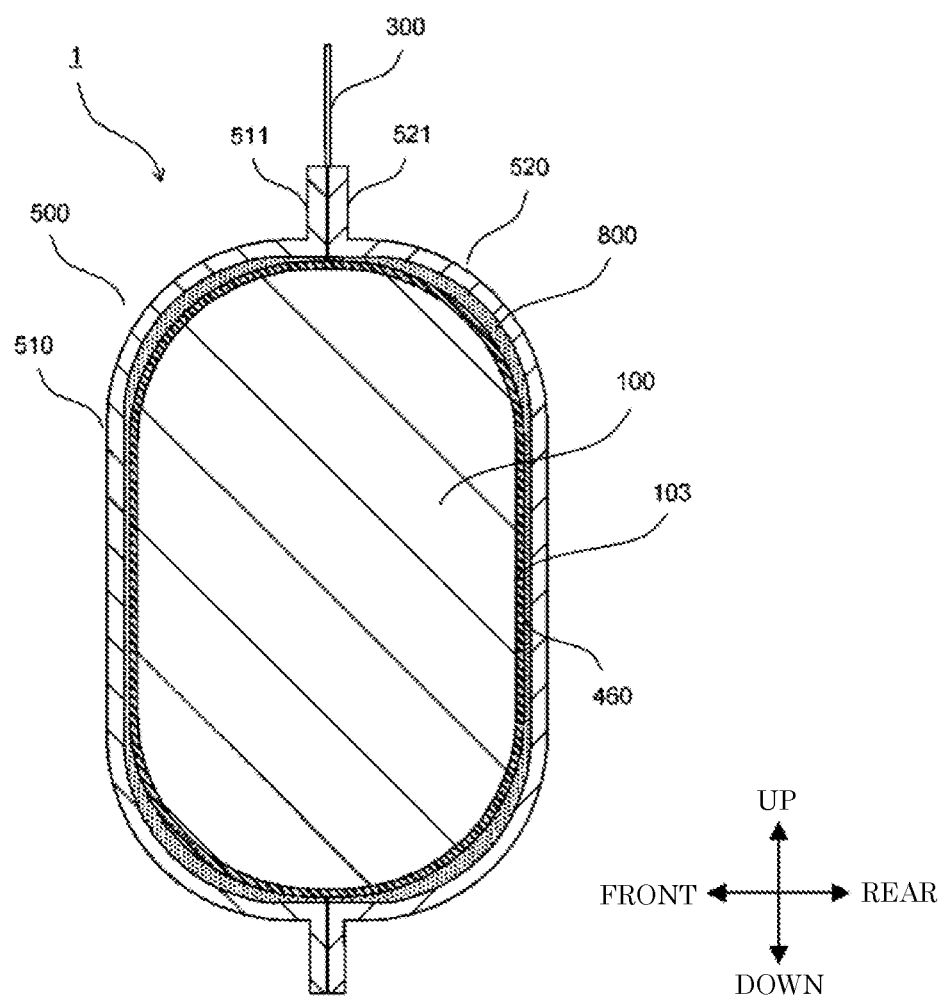
FIG. 23 is a side cross-sectional view illustrating a film capacitor according to a modified example of the third exemplary embodiment cut at a middle of a capacitor element.

As shown in FIG. 23, an interior of exterior member 500, which covers capacitor element 100 and other parts, may be filled with filler resin 800. Filler resin 800 includes a thermosetting resin such as an epoxy resin. In this case, left part, right part, and lower part of first flange 511 of exterior member 500 are joined with left part, right part, and lower part of second flange 521 of exterior member 500, respectively. After that, a nozzle or another tool is inserted into exterior member 500 through an unjoined boundary between upper part of first flange 511 and upper part of second flange 521, and then molten filler resin 800 is injected through the nozzle or the tool, for example. In order to facilitate insertion of filler resin 800 into the interior of exterior member 500, which is a narrow-gap, it is preferred that filler resin 800 is injected by applying pressure. Alternatively, in order to facilitate insertion of filler resin 800 into the interior of exterior member 500, air inside exterior member 500 may be removed by a device such as a vacuum pump. After the interior of exterior member 500 is filled with filler resin 800, exterior member 500 is heated to cure filler resin 800 inside.

According to this configuration, capacitor element 100 is covered with filler resin 800 as well as exterior member 500. Thus, filler resin 800 also intercepts moisture. It is expected that the effect of preventing capacitor element 100 from absorbing moisture is further improved. Even if a part inadequately joined between first flange 511 and second flange 521, which are thermally welded or adhesively bonded, filler resin 800 gets into a gap of the part to ensure sealing performance.

The modified examples of FIGS. 21 to 23 may be combined as appropriate. For instance, in the modified example of FIGS. 22A and 22B, the interior of exterior member 600 may be filled with filler resin 800. In this case, sealing plate 700 has, for example, an injection port through which molten filler resin 800 is injected.

A number of capacitor elements 100 included in film capacitor 1 is not limited to the number specified in the first to the third exemplary embodiments described above, and may be changed as appropriate depending on required electrical capacitance. In other words, one capacitor element 100 is covered with exterior member 500 in the above-described exemplary embodiments. Meanwhile, the number of capacitor elements 100 is not limited to this example. A plurality of capacitor elements 100 may be covered with exterior member 500.

In the first to the third exemplary embodiments described above, capacitor element 100 is formed by stacking two metalized films in each of which aluminum is deposited on the dielectric film, and winding or laminating the stacked metalized films. Alternatively, capacitor element 100 may be formed by stacking an insulating film and a metalized film that includes a dielectric film and aluminum deposited on both sides of the dielectric film, and winding or laminating the stacked insulating film and the metalized film.

A capacitor according to the present disclosure may be of any type other than film capacitor 1 in the first to the third exemplary embodiments described above.

In addition, various modifications can be appropriately made to the exemplary embodiments of the present disclosure within the scope of the technical idea disclosed in the claims.

It should be noted that, in the description of the first to third exemplary embodiments described above, a term indicating a direction, such as "upward" or "downward", indicates a relative direction that only depends on a relative positional relationship of constituent members, and does not indicate an absolute direction, such as a vertical direction or a horizontal direction.

The present disclosure is useful for capacitors for use in various types of electronic devices, electrical devices, industrial equipment, electric components for vehicles, and the like.

What is claimed is:
1. A capacitor comprising:
a capacitor element;
a first electrode disposed on an end face of the capacitor element;
a second electrode disposed on another end face of the capacitor element;
a first bus bar connected to the first electrode;
a second bus bar connected to the second electrode;
an exterior member including a metal laminate film, the exterior member covering the capacitor element and having an opening through which a part of the first bus bar and a part of the second bus bar are led out; and
a filler resin filling an interior of the exterior member to seal the opening,
wherein the exterior member is a joint body including a first component and a second component which are joined together to open only in one direction from the capacitor element to outside at the opening, the first component covering a portion of the capacitor element, the second component covering a remaining portion of the capacitor element.

2. The capacitor according to claim 1, wherein an end portion of the exterior member has a tapered shape that become narrow toward the opening of the exterior member, the end portion of the exterior member is located at a side close to the opening of the exterior member.

3. The capacitor according to claim 1, wherein an adhesive is adhered to an inner surface of the exterior member.

4. A capacitor comprising:
a capacitor element;
a first electrode disposed on an end face of the capacitor element;
a second electrode disposed on another end face of the capacitor element;
a first bus bar connected to the first electrode;
a second bus bar connected to the second electrode;
an exterior member including a metal laminate film, the exterior member covering the capacitor element and having an opening through which a part of the first bus bar and a part of the second bus bar are led out; and
a sealing member sealing the opening, wherein:
the exterior member is a joint body including a first component and a second component which are joined together to open only in one direction from the capacitor element to outside at the opening, the first component covering a portion of the capacitor element, the second component covering a remaining portion of the capacitor element, and
the first bus bar and the second bus bar pass through the sealing member.

5. The capacitor according to claim 4, wherein the sealing member includes an attachment part for attaching the capacitor.

6. The capacitor according to claim 4, wherein:
the sealing member is fit into the opening, and
a tightening member is mounted on an outer periphery of a part of the exterior member to tighten the part of the exterior member inward, the part of the exterior member being in contact with the sealing member.

7. The capacitor according to claim 4, wherein:
the sealing member is fit into the opening,
the sealing member has a dent at an outer peripheral edge of the sealing member, and
the dent and a periphery of the opening form a groove where an adhesive is allowed to be deposited.

8. The capacitor according to claim 4, wherein an interior of the exterior member is filled with a filler resin.

9. A capacitor comprising:
a capacitor element;
a first electrode disposed on an end face of the capacitor element
a second electrode disposed on another end face of the capacitor element
a first bus bar connected to the first electrode;
a second bus bar connected to the second electrode;
an exterior member including a metal laminate film and covering the capacitor element; and
a coating layer covering an outer peripheral edge of the first electrode and an outer peripheral edge of the second electrode, the coating layer having an electrical insulating property,
wherein the exterior member is a joint body including a first component and a second component which are joined together to let each of the first bus bar and the second bus bar be let out through a boundary between the first component and the second component only in one direction from the capacitor element to outside, the first component covering a portion of the capacitor element, the second component covering a remaining portion of the capacitor element.

10. The capacitor according to claim 9, wherein the coating layer includes a thermal conductive sheet having an electrical insulating property, the coating layer covering a part of an outer peripheral surface of the capacitor element, the outer peripheral edge of the first electrode, and the outer peripheral edge of the second electrode.

11. The capacitor according to claim 9, wherein an interior of the exterior member is filled with a filler resin.

12. The capacitor according to claim 1, wherein:
at a boundary between the first component and the second component, the first component has a first opening and the second component has a second opening, and
the first opening and the second opening are combined to constitute the opening of the exterior member.

13. The capacitor according to claim 4, wherein:
at a boundary between the first component and the second component, the first component has a first opening and the second component has a second opening, and
the first opening and the second opening are combined to constitute the opening of the exterior member.

14. The capacitor according to claim 9, wherein:
the coating layer covers an entirety of an outer peripheral surface of the capacitor element, and
at least a part of the coating layer on the outer peripheral surface of the capacitor element is in contact with an inner surface of the exterior member.

15. A capacitor comprising:
a capacitor element;
a first electrode disposed on an end face of the capacitor element;
a second electrode disposed on another end face of the capacitor element;
a first bus bar connected to the first electrode;
a second bus bar connected to the second electrode;
an exterior member including a metal laminate film, the exterior member covering the capacitor element and having an opening through which a part of the first bus bar and a part of the second bus bar are led out; and
a sealing member sealing the opening, wherein:
the first bus bar and the second bus bar pass through the sealing member,
the sealing member is fit into the opening, and
a tightening member is mounted on an outer periphery of a part of the exterior member to tighten the part of the exterior member inward, the part of the exterior member being in contact with the sealing member.

16. The capacitor according to claim 15, wherein the sealing member includes an attachment part for attaching the capacitor.

17. The capacitor according to claim 15, wherein:
the sealing member has a dent at an outer peripheral edge of the sealing member, and
the dent and a periphery of the opening form a groove where an adhesive is allowed to be deposited.

18. The capacitor according to claim 15, wherein an interior of the exterior member is filled with a filler resin.

19. A capacitor comprising:
a capacitor element;
a first electrode disposed on an end face of the capacitor element;
a second electrode disposed on another end face of the capacitor element;
a first bus bar connected to the first electrode;
a second bus bar connected to the second electrode;
an exterior member including a metal laminate film, the exterior member covering the capacitor element and having an opening through which a part of the first bus bar and a part of the second bus bar are led out; and
a sealing member sealing the opening, wherein:
the first bus bar and the second bus bar pass through the sealing member,
the sealing member is fit into the opening,
the sealing member has a dent at an outer peripheral edge of the sealing member, and
the dent and a periphery of the opening form a groove where an adhesive is allowed to be deposited.

20. The capacitor according to claim 19, wherein the sealing member includes an attachment part for attaching the capacitor.

21. The capacitor according to claim 19, wherein an interior of the exterior member is filled with a filler resin.

* * * * *